(12) United States Patent
Anderson et al.

(10) Patent No.: US 9,092,447 B1
(45) Date of Patent: *Jul. 28, 2015

(54) METHOD AND SYSTEM FOR DUPLICATE DETECTION

(71) Applicant: JPMorgan Chase Bank, N. A., New York, NY (US)

(72) Inventors: Milton M. Anderson, Fair Haven, NJ (US); Dieter Scriven, Columbus, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 237 days.

This patent is subject to a terminal disclaimer.

(21) Appl. No.: 13/790,827

(22) Filed: Mar. 8, 2013

Related U.S. Application Data

(63) Continuation-in-part of application No. 13/616,099, filed on Sep. 14, 2012, now Pat. No. 8,639,017, which is a continuation of application No. 12/254,333, filed on Oct. 20, 2008, now Pat. No. 8,391,584.

(51) Int. Cl.
*G06F 17/30* (2006.01)

(52) U.S. Cl.
CPC ............................. *G06F 17/30156* (2013.01)

(58) Field of Classification Search
None
See application file for complete search history.

(56) References Cited

U.S. PATENT DOCUMENTS

| | | | |
|---|---|---|---|
| 3,653,480 A | 4/1972 | Yamamoto et al. | |
| 4,050,375 A | 9/1977 | Orleans | |
| 4,141,078 A | 2/1979 | Bridges et al. | |
| 4,205,780 A | 6/1980 | Burns et al. | |
| 4,264,808 A | 4/1981 | Owens et al. | |
| 4,321,672 A | 3/1982 | Braun et al. | |
| 4,396,985 A | 8/1983 | Ohara | |
| RE31,692 E | 10/1984 | Tyburski et al. | |
| 4,495,018 A | 1/1985 | Vohrer | |
| 4,617,457 A | 10/1986 | Myers | |
| 4,672,377 A | 6/1987 | Murphy | |
| 4,694,397 A | 9/1987 | Grant et al. | |
| 4,700,055 A | 10/1987 | Kashkashian, Jr. | |

(Continued)

FOREIGN PATENT DOCUMENTS

| | | |
|---|---|---|
| EP | 421808 | 4/1991 |
| EP | 1014318 | 6/2000 |

(Continued)

OTHER PUBLICATIONS

Hunt, Robert M., An Introduction to the Economics of Payment Card Networks.

(Continued)

*Primary Examiner* — Nancy Bitar
(74) *Attorney, Agent, or Firm* — Hunton & Williams LLP

(57) ABSTRACT

A system and method for detecting duplicates during processing. The duplicate detection may be performed by a financial institution, such as a bank. The method may be implemented on a computer based system. The duplicate detection method may be automated. The method may be applied initially to incoming electronic data files prior to further processing of the electronic data to prevent processing of duplicate items. The system and method may use a function, such as a hash function, to perform the duplicate detection. Other functions, such as a Bloom filter which may use multiple hash functions, may be used to perform the duplicate detection.

38 Claims, 9 Drawing Sheets

(56) References Cited

U.S. PATENT DOCUMENTS

| | | |
|---|---|---|
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tarter et al. |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |

(56) References Cited

U.S. PATENT DOCUMENTS

| | | |
|---|---|---|
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,021,202 A | 2/2000 | Anderson et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Ballard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,209,095 B1 | 3/2001 | Anderson et al. |
| 6,213,391 B1 | 4/2001 | Lewis |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,343,279 B1 | 1/2002 | Bissonette et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,536,663 B1 | 3/2003 | Lozier et al. |
| 6,554,185 B1 | 4/2003 | Montross et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,609,200 B2 | 8/2003 | Anderson et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| 6,820,058 B2 | 11/2004 | Wood et al. |
| 6,825,940 B1 | 11/2004 | Wu et al. |
| 6,860,375 B2 | 3/2005 | Hallowell et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,855 B2 | 11/2005 | Das et al. |
| RE38,957 E | 1/2006 | Laussermair et al. |
| 7,004,382 B2 | 2/2006 | Sandru |
| 7,062,456 B1 | 6/2006 | Riehl et al. |
| 7,068,832 B1 | 6/2006 | Price et al. |
| 7,104,443 B1 | 9/2006 | Paul et al. |
| 7,133,846 B1 | 11/2006 | Ginter et al. |
| 7,177,836 B1 | 2/2007 | German et al. |
| 7,200,255 B2 | 4/2007 | Jones et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| 7,380,707 B1 | 6/2008 | Fredman |
| 7,401,048 B2 | 7/2008 | Rosedale et al. |
| 8,185,459 B2 | 5/2012 | Wall et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0032139 A1 | 10/2001 | Debonnett, Jr. |
| 2001/0037300 A1 | 11/2001 | Miyazaki et al. |

(56) References Cited

U.S. PATENT DOCUMENTS

| | | | |
|---|---|---|---|
| 2001/0037309 A1 | 11/2001 | Vrain | |
| 2001/0047334 A1 | 11/2001 | Nappe et al. | |
| 2001/0047489 A1 | 11/2001 | Ito et al. | |
| 2001/0051533 A1 | 12/2001 | Wietzke et al. | |
| 2002/0012445 A1 | 1/2002 | Perry | |
| 2002/0013728 A1 | 1/2002 | Wilkman | |
| 2002/0023055 A1 | 2/2002 | Antognini et al. | |
| 2002/0026394 A1 | 2/2002 | Savage et al. | |
| 2002/0038363 A1 | 3/2002 | MacLean | |
| 2002/0046169 A1 | 4/2002 | Keresman, III et al. | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0028790 A1 | 2/2003 | Bleumer et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0069780 A1 | 4/2003 | Hailwood et al. | |
| 2003/0097335 A1 | 5/2003 | Muskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1 | 4/2004 | Kight et al. | |
| 2004/0078328 A1 | 4/2004 | Talbert et al. | |
| 2004/0133516 A1 | 7/2004 | Buchanan et al. | |
| 2004/0201735 A1 | 10/2004 | Baron | |
| 2004/0228514 A1 | 11/2004 | Houle et al. | |
| 2005/0018668 A1* | 1/2005 | Cheriton | 370/389 |
| 2005/0033690 A1 | 2/2005 | Antognini et al. | |
| 2005/0055254 A1 | 3/2005 | Schmidtberg et al. | |
| 2005/0086178 A1 | 4/2005 | Xie et al. | |
| 2005/0091156 A1 | 4/2005 | Hailwood et al. | |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0207635 A1* | 9/2005 | Lazar et al. | 382/139 |
| 2005/0209954 A1 | 9/2005 | Asher et al. | |
| 2005/0261955 A1 | 11/2005 | Humble et al. | |
| 2006/0106650 A1 | 5/2006 | Bush | |
| 2006/0106717 A1 | 5/2006 | Randle et al. | |
| 2006/0136335 A1 | 6/2006 | Ferguson, III | |
| 2006/0178986 A1 | 8/2006 | Giordano et al. | |
| 2006/0206427 A1 | 9/2006 | Love et al. | |
| 2006/0282389 A1 | 12/2006 | Gupte | |
| 2006/0287953 A1 | 12/2006 | Chauhan | |
| 2007/0294183 A1 | 12/2007 | Camenisch et al. | |
| 2008/0103790 A1* | 5/2008 | Abernethy et al. | 705/1 |
| 2008/0116257 A1* | 5/2008 | Fickling | 235/379 |
| 2008/0154852 A1* | 6/2008 | Beyer et al. | 707/3 |
| 2008/0193008 A1 | 8/2008 | Mount et al. | |
| 2011/0288974 A1* | 11/2011 | Pearson et al. | 705/34 |

FOREIGN PATENT DOCUMENTS

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |
| WO | WO 2008/057928 | 5/2008 |

OTHER PUBLICATIONS

Annual Report Pursuant to Sectin 13 or 15(d) of the Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card—Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

(56) References Cited

OTHER PUBLICATIONS

Norris, First data unit develops blockbuster cash card, Omaha World Hearld Sunrise Edition, Business Section, Jan. 19, 1996, p. 16.
Harsh Truth: Your Investments Likely Won't Make Any Money. Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Armstrong, Douglas, Norwest eases difficulty of Interstate banking Bank's customers may use the same account number at any branch.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Maturi, Richard, Personal Finance; When you Need to Send Cash in a Flash.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 10561528, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Anderson, M., "The Electronic Check Architecture", Financial Services Technology Consortium, Version 1.0.2, (Sep. 29, 1998).
Metwally, A., et al., "Duplicate Detection in Click Streams", Department of Computer Science, University of California at Santa Barbara, (2005).
Unknown, "American National Standard for Financial Services—ANS X9.100-160-1-2004 (formerly published as ANS X9.13 Part 1: Placement and Location of Magnetic Ink Printing (MICR)", American National Standards Institute, Oct. 15, 2004.
Unknown, "Financial Services Draft Standard for Trial Use—DSTU X9.37-2003 Specifications for Electronic Exchange of Check and Image Data", Accredited Standards Committee X9, Inc., Mar. 31, 2003.

\* cited by examiner

METHOD AND SYSTEM FOR DUPLICATE DETECTION

CROSS-REFERENCE TO RELATED APPLICATIONS

This patent application is a Continuation-in-Part of U.S. patent application Ser. No. 13/616,099, filed on Sep. 14, 2012, entitled "Method and System for Duplicate Check Detection," which is a Continuation of U.S. patent application Ser. No. 12/254,333, filed on Oct. 20, 2008, entitled "Method and System for Duplicate Check Detection." The disclosure of these priority applications are hereby incorporated by reference in their entirety.

FIELD OF PREFERRED EMBODIMENTS

Exemplary embodiments relate generally to processing of electronic data by a financial institution. More specifically, exemplary embodiments are directed to a method and system for detecting duplicate items during the processing of electronic data relating to transactions by a financial institution or other entity.

BACKGROUND

Financial institutions, such as banks and credit unions, process checks and other transaction related data. Larger financial institutions may process a significant volume of checks and transaction data. It is possible, given the volume of data, for multiple instances of the same check or transaction to occur. In other words, duplicate copies of an imaged check or transaction can exist. Duplicate checks and transactions can also exist, for example, because of fraud, data processing errors, and printing errors.

If duplicate instances of a check or a transaction exist, the financial institution processes and posts each of the multiple instances. This means that the same check or transaction is paid out more than once. Such multiple payments lead to accounting issues, service problems, customer dissatisfaction, and losses due to fraud. Furthermore, such double payments or postings can be indicative of fraud.

It should be appreciated that duplicate checks and transactions can be legitimate duplicates. For example, checks presented for return, re-presentment, or re-deposit are examples of such cases. Other such instances may exist.

Financial institutions can employ various methods for detection of such duplicate checks and transactions, typically known as duplicate detection methods. These existing methods suffer from various drawbacks. For example, some current methods for duplicate detection are performed manually. Such manual detection methods include an operator comparing current checks and transaction against an historical database. This type of comparison is time consuming and expensive. Further, operators make errors and miss duplicates.

These and other deficiencies exist.

SUMMARY OF THE PREFERRED EMBODIMENTS

An embodiment of the present invention provides a computer-implemented method for detecting duplicates, such as for example duplicate transactions and checks. Transaction data may be electronically received wherein the transaction data may be accounting data associated with one or more transactions and have one more components. One or more of the components may be extracted from the transaction data for each individual transaction. A string of characters based on the one or more extracted components may be created. A function may be applied to the account data and/or the string wherein the function may compute a value based on the transaction data and/or the string. An element may be selected from a set where an index of the element corresponds to the computed value. A transaction may be determined to be a suspected duplicate if the element is in an altered state, such as a first value. A determination that the transaction may not be a duplicate may be made if the element is in an initialized state, such as an initial value. The element may be modified for processing of further transactions by altering a state of the element.

The comparison may be performed by creating a hash value from the transaction data string based on the one or more components using a hash function. The hash value may be used to calculate a bit and byte address of a single bit entry in a hash table. The value of the bit so addressed in the hash table may be read. If the bit is equal to a first value, an identification or flag may be attached to the transaction data string identifying the string as a suspected duplicate. If the bit is equal to the initial value, a different identification or flag may be attached to the hash string identifying the transaction data string as one that has never been processed during the period that the table has been in use. Finally, the bit addressed in the hash table may then be set to the first value to signify to further processing that a transaction with a string hashing to that address has already been processed. According to an exemplary embodiment, so long as the bits in the table may be initialized to the initial value, and so long as the ratio of bits in the table is a multiple of the transactions to be processed, the probability that a transaction will be called a suspect duplicate falsely may be one over the multiple. In this example, false negatives may be minimized. To decrease the false suspect rate for a given table size, or to minimize table size for a given number of transactions, the hash table may use a Bloom filter. The Bloom filter may use at least two hash functions.

Exemplary embodiments include a system for detecting duplicate transactions having at least one processor; a memory comprising computer-readable instructions which when executed by the processor cause the processor to perform the following steps: receiving electronic data that comprises accounting data associated with one or more transactions; processing the electronic data to extract the accounting data; creating a character string from a subset of the accounting data for each of the one or more transactions; applying a Bloom filter using four hash functions to the character string; determining that a transaction is a potential suspected duplicate if each bit value read is equal to a first value; determining that the transaction is not a suspected duplicate if at least one bit value is not equal to the first value; outputting a listing of each potential suspected duplicate; and performing additional processing on each potential suspected duplicate to determine if the potential suspected duplicate is a true duplicate. Exemplary embodiments include a method for detecting duplicate transactions having the following steps: receiving electronic data that comprises accounting data associated with one or more transactions; processing the electronic data to extract the accounting data; creating a character string from a subset of the accounting data for each of the one or more transactions; applying a Bloom filter using four hash functions to the character string; determining that a transaction is a potential suspected duplicate if each bit value read is equal to a first value; determining that the transaction is not a suspected duplicate if at least one bit value is not equal to the first value; outputting a listing of each potential suspected duplicate; and performing additional processing on each potential suspected duplicate to determine if the potential suspected duplicate is a true duplicate. One or more of the method steps are performed by at least one processor.

Advantages of this invention in addition to those described above are apparent from the following detailed description of the preferred embodiment of the invention.

Figure 1:
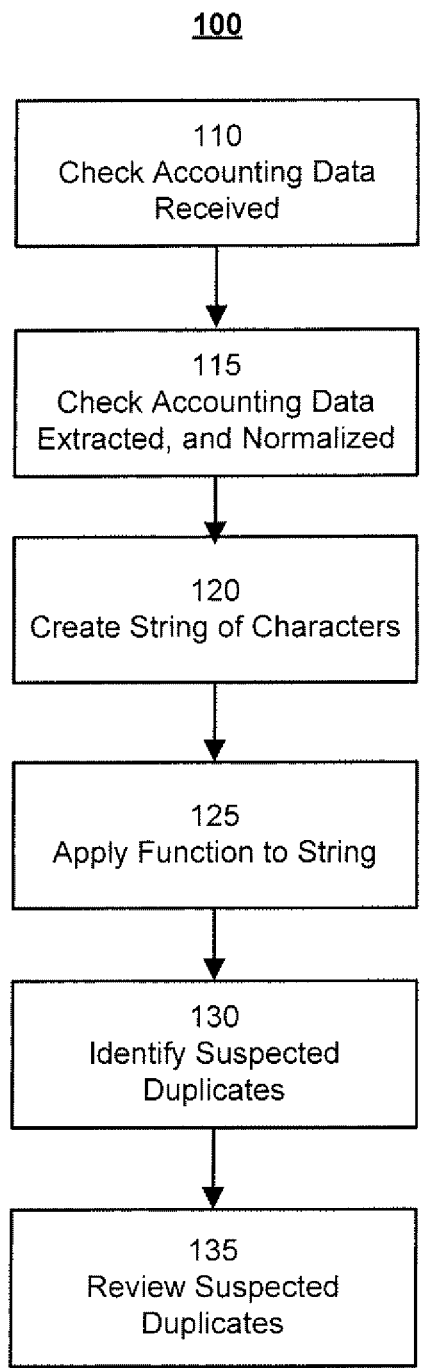
FIG. 1 is a flow chart of a method of duplicate check detection in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions are susceptible to broad utility and application. Many embodiments and adaptations of the embodiments of the inventions other than those herein described, as well as many variations, modifications and equivalent arrangements, will be apparent from or reasonably suggested by the embodiments of the inventions and foregoing description thereof, without departing from the substance or scope of the invention.

Accordingly, while the embodiments of the inventions have been described here in detail in relation to its exemplary embodiments, it is to be understood that this disclosure is illustrative and exemplary of the embodiments of the inventions and is made to provide an enabling disclosure of the invention. Accordingly, the subsequent disclosure is not intended to be construed or to limit the embodiments of the inventions or otherwise to exclude any other such embodiments, adaptations, variations, modifications and equivalent arrangements. While the various embodiments of the present inventions are described in the context of check processing, the duplicate detection methods described herein may be applied to other items, such as documents, to perform duplicate detection.

An embodiment of the present invention is directed to detecting improper multiple instances of a check. For example, an embodiment of the present invention may ensure that on-us checks are not posted more than once and transit checks are not presented more than once to another financial institution for collection. An embodiment of the present invention also recognizes that the same item may be legitimately processed multiple times for valid reasons, such as return, re-presentment or re-deposit. In addition, some check writers may create legitimate duplicates.

An embodiment of the present invention is directed to detecting improper multiple instances of a transaction. For example, an embodiment of the present invention may ensure that multiple instances of a transaction are not posted. The transactions may be of a variety of types including, but not limited to, bankcard transactions, including credit and PIN and non-PIN debit transactions, ACH payments, including credit and debit transactions, rewards transactions, securities transactions, and wire transfers. Each of these transactions has a group of electronic data elements that can be used by the methods described above to detect suspected duplicate transactions.

An embodiment of the present invention may implement a hash routine to automate the processing of detecting duplicates. Other routines may be used as well. For example, a hash table may be used for screening the checks and other electronic data. In an exemplary embodiment of the present invention, a single bit hash table may be used. For each new check or transaction, the system may concatenate the various data elements associated with the check or transaction into a normalized string. These fields may be extracted from the MICR data associated with the check or from the electronic data elements associated with the transaction. The elements may be a subset of the MICR data or the electronic data elements. The resulting string may then be hashed to a bit-address in a range about 100 times, for example, the expected volume of checks or transactions. According to one exemplary embodiment, if the bit in the table at that address is an initialized or initial value (e.g., 0), the item may not have been seen before. If the bit in the table at that address is an altered or first value (e.g., 1), the item may have been seen before, so a query to a database of already processed checks and transactions may be performed to determine whether the present check or transaction is a duplicate of one already received before insertion of the new check or transaction data. The initial bit value may then be set to the first value (e.g., 1) so if the bit address arises again, then it is known to have been possibly seen before. The query of the database of already received check and transactions may be omitted before the insertion of the present check or transactions. With a bit address range 100 times the number of checks or transactions being processed, the query may be omitted for more than 99% of the checks and transactions. Omitting the query of the database before insert may result in a substantial savings in computing resources. Any hash that results in a uniform distribution of the mapping of items into the address space can be used. Preferably, a single bit hash function may be used for speed and economy of computing resources. Filters, such as Bloom filters, may be implemented with multiple hash functions. For example, 4 single bit hash functions may be incorporated into the Bloom filter. Each single bit from each hash function may equal a first value to designate the check or transaction as a suspected duplicate. An important advantage may be that the hash table may be small enough to fit into RAM on the servers, and therefore efficient duplicate detection may be performed using the memory of the server, even with processing tens of millions of checks and transactions. This may obviate the need to access databases or files on disk, which may be slow and expensive. Duplicate detection may be performed between paper and imaged checks and paper and electronic transaction data. Duplicate detection may further be performed between checks and Account Clearing House (ACH) transactions that were originally in the form of checks, but converted to ACH at a point of sale, a back office conversion, or an accounts receivable conversion. Duplicate detection may further be performed between different types of transactions. It should be appreciated that different systems may be used for duplicate detection of different items. For example, one system may handle checks and another system or systems may handle transaction data.

Duplicate detection for checks will first be described with respect to FIGS. 1-5. Then duplicate detection for transaction data will be described with respect to FIGS. 6-9. It should be appreciated that while these embodiments are described separately, they may be combined.

A need exists to efficiently detect duplicate checks early in the processing cycle using a single detection process. Such duplicate detection can ensure that checks are not posted twice to an account or presented twice to another financial institution for collection. Furthermore, the method of duplicate detection needs to be efficiently scalable to volumes of a few tens of millions of checks per day without requiring a massive investment in database software, disk storage hardware and processors to support a large number of database searches per second.

An embodiment of the present invention is directed to duplicate check resolution. Many suspect checks may be resolved (e.g., determined if they are suspect) by querying a database using a query on the combination of certain check accounting data fields, such as those found in the MICR data or other such similar data. For example, the aux on-us, RT, on-us, amount, and other fields may be used. If the MICR or other such similar data is identical or substantially similar, the system may then (1) determine whether the check has been returned and is being re-deposited or re-presented; (2) compare the check with controlled disbursement RT checks (and accounts); and/or (3) compare the check with a table of RT/on-us field values that are known to be legitimate duplicates. If the suspect check is not resolved by the automated process, a case for manual resolution may be created in remediation workflow. Other resolutions for suspect checks may be implemented.

FIG. 1 depicts a flow chart of a method of duplicate check detection of an exemplary embodiment. Exemplary method 100 is provided by way of example, as there are a variety of ways to carry out the methods disclosed herein. The method 100 as shown in FIG. 1 may be executed or otherwise performed by one or a combination of various systems, such as a computer implemented system. Each block shown in FIG. 1 represents one or more processes, methods, and/or subroutines carried out in the exemplary method 100. Each block may have an associated processing machine or the blocks depicted may be carried out through one processor machine. Input may be desired from a user during various parts of the below described method, the input may be accomplished through a user interface. Referring to FIG. 1, the exemplary method 100 may begin at block 110. At block 110, a check file, containing check accounting data, may be received. At block 115, elements of the check accounting data may be extracted and normalized. At block 120, a string of characters may be created. At block 125, a function may be applied to the string. At block 130, suspected duplicates may be identified. At block 135, the suspected duplicates may be reviewed. These steps will be described in greater detail below.

While the method of FIG. 1 illustrates certain steps performed in a particular order, it should be understood that the embodiments of the present invention may be practiced by adding one or more steps to the processes, omitting steps within the processes and/or altering the order in which one or more steps are performed.

At block 110, a check file may be received by a financial institution or other entity. The financial institution may be a bank, credit union, or other such related entity. The check file may include accounting data and, optionally, images of more than one check. The checks may be in a standard format wherein the standard format is used by the other institutions to facilitate and standardize the exchange of data and images. For example, an image format, such as X9.37 may be used. The X9.37 image file is a current standard format which uses TIFF based images of the checks along with their associated data. It should be appreciated that other formats and/or combinations of formats may be used.

The check file may be received by the financial institution through a processing system. Various processing systems may be used. The check file may contain information pertaining to one or more checks. Such information may include check accounting data and/or other data. Check accounting data may be contained in magnetic ink printing, such as MICR. In the exemplary X9.37 format, this data may be contained in the Type 25 record as aux on-us, RT, on-us, and amount data fields. It should be appreciated that other such formats may be used for check accounting data.

At block 115, elements of the check accounting data may be extracted and normalized. For example, certain elements of the MICR data may be extracted. According to an exemplary embodiment, elements to extract may be chosen because they may represent unique information to that particular check. For example, fields representing the aux on-us code, the routing and transit number, on-us code, and amount of the check (e.g., fields 2, 4, 6, and 7 of the Type 25 record) may be extracted from the MICR data. These fields may be used because they are part of the MICR and represent fields within the MICR standard that typically vary from check to check. It should be appreciated that other fields and/or combinations of fields may be used. In an exemplary embodiment, non-numeric characters, such as letters and symbols, may be eliminated from the string to normalize it. It should be appreciated that the normalization of data elements may be extended to allow detection of duplicates between paper checks, imaged checks, IRDs, checks converted to ACH transactions, and other payment instruments.

At block 120, a string of characters may be created in a form which standardizes the data and removes variations due to differences in the prior capture and data processing systems in order to allow a valid comparison among checks received from different sources. For example, the string of characters may be created at least in part from the elements extracted in block 115. Because the string of characters may be normalized according to an exemplary embodiment, the string created may be numeric in content. The string may then be created by concatenating the extracted fields. Such a string may have a resulting length, such as length L. For example, selected record fields may be extracted from the MICR data, as discussed above, any non-numeric characters may be squeezed out, and then any remaining numeric characters may be combined into a string which may have a length L. It should be appreciated that other strings or combination of data fields may be created.

At block 125, a function may be applied to the string from block 120. The function may be any suitable function to reduce the string to one of a set of elements, e.g., a set of ordered values which may be used as an index to a set of Boolean objects. The function may be a mathematical function that converts the data, such as the string of characters, into an integer, such as a uniformly distributed pseudorandom integer, which may serve as an index into an array, such as an array of bits. According to certain applications, a hash table including individually addressed bits may be preferred based upon its small size (relative to computer memory requirements) and ability to provide fast and efficient screening of data. If such a table is initially filled with a value in an initialized state, or initial value, such as "0", and the bits are set to an altered state, such as a first value, e.g. "1", when addressed, a new check can be determined to not be a suspect duplicate if the bit addressed was not equal to the first value, since no check that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash tables may be used.

At block 130, suspected duplicates may be identified. For example, the suspected duplicates may be identified based on a comparison of the dataset obtained by applying a function, such as the hash function, in block 125. If two datasets have matching characters or are considered substantially similar, then the two checks that the data was extracted from may be considered duplicates. Such suspected duplicates may be flagged for further review. The dataset may be compared against a dataset which may include other check data from a pre-determined time period. A pre-determined time period may be selected to allow a comparison with historical data wherein a duplicate of a particular check may be reasonably found. For example, a previous number of weeks, such as the previous four weeks, of processed checks may be used. Other time periods of data may be used.

In one embodiment, an element may be selected from a set where an index of the element may correspond to the computed value from the function applied in block 125, such as a hash function. The set may be an array. The check may be determined to not be a duplicate if the element is in an initialized state, such as "0". The check may be determined to be a suspected duplicate if the element is in an altered state, such as "1". Following the determination, if the element was in the initialized state, the state of the element may be modified such that it may be in the altered state.

At block 135, the suspected duplicates may be reviewed. Such a review may be performed as an additional check to confirm that the checks are indeed duplicates. This review may also identify false-positives. It should be appreciated that suspected duplicates identified by the function in block 120 may be a random collision of values. A random collision of values may occur if the string and another string happen to result in the same hash value, but in reality are not duplicates. In an exemplary embodiment, the review of the suspected duplicates may be manually conducted by an operator. The operator may compare the suspected duplicates against a historical database of checks processed within a pre-determined period of time. For example, the suspected duplicates may be compared against checks processed within the last year or other predetermined time periods. In some embodiments, the review may also be automated with minimal or no operator intervention.

Figure 2:
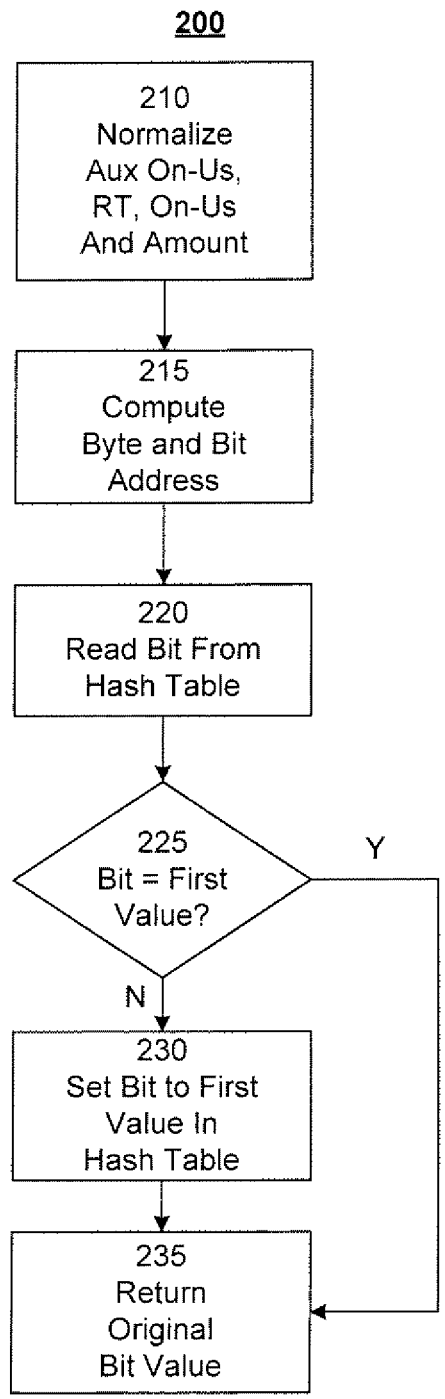
FIG. 2 is a flow chart of a method of duplicate detection using a hash function for duplicate check detection in accordance with an exemplary embodiment.

FIG. 2 depicts a flow chart of a method using a hash function for duplicate check detection in an exemplary embodiment. Exemplary method 200 is provided by way of example, as there are a variety of ways to carry out the methods disclosed herein. The method 200 as shown in FIG. 2 may be executed or otherwise performed by one or a combination of various systems, such as a computer implemented system. Each block shown in FIG. 2 represents one or more processes, methods, and/or subroutines carried out in the exemplary method 200. Each block may have an associated processing machine or the blocks depicted may be carried out through one processor machine. Input may be desired from a user during various parts of the below described method, the input may be accomplished through a user interface. Referring to FIG. 2, the exemplary method 200 may begin at block 210. At block 210, check data may be normalized. At block 215, a byte and bit address may be computed. At block 220, a bit may be read from the hash table At block 225, a check may be performed to determine if the bit value equals a first value. At block 230, the bit may be set to the first value in the hash table. At block 235, the original bit value is returned. These steps will be described in greater detail below.

While the method of FIG. 2 illustrates certain steps performed in a particular order, it should be understood that the embodiments of the present invention may be practiced by adding one or more steps to the processes, omitting steps within the processes and/or altering the order in which one or more steps are performed.

At block 210, check data may be normalized. The normalization of the check data may include extraction of certain check accounting data, creating a string of characters from the extracted data, and normalizing the string through the use of a suitable function. The first step in normalization may involve extracting elements of the check accounting data. Certain fields may be extracted from the MICR data on the bottom of a check or from the type 25 record in the X9.37 check image file. For example, certain elements of the MICR data may be extracted. According to an exemplary embodiment, these certain elements to extract may be chosen since they may represent unique information to that particular check because they represent fields within the MICR standard that typically vary from check to check. For example, fields representing the aux on-us code, the routing and transit number, on-us code, and amount of the check (e.g., field 2, 4, 6, and 7 of the X9.37 Type 25 record) may be extracted from the MICR data. It should be appreciated that other fields and/or combinations of fields may be used.

Next, a string of characters may be created from the extracted MICR data. In an exemplary embodiment, non-numeric characters, such as letters and symbols, may be eliminated from the string. Therefore, according to an exemplary embodiment, the string created may be numeric in content. The string may then be created by concatenating the extracted fields. Such a string may have a resulting length, such as length L. For example, selected record fields may be extracted from the MICR data, as discussed above, any non-numeric characters may be squeezed out, and then remaining numeric characters may be combined into a string which has a length L. It should be appreciated that other strings or combination of data fields may be created.

Then, a function may be applied to the string to normalize it into a suitable format for indexing, sorting, and/or comparing to other such strings in an efficient manner. The function may be any suitable function to reduce the string to one of a set of ordered values which may be used as an index to a set of Boolean objects. Such a function may be a mathematical function that converts the data, such as the string of characters, into an integer, such as a uniformly distributed pseudo-random integer, which may serve as an index into an array, such as an array of bits. According to certain applications, a hash table including individually addressed bits may be preferred based upon its small size (relative to computer memory requirements) and ability to provide fast and efficient screening of data. If such a table is initially filled with a initial value, such as "0", and the bits are set to an altered, or first value, such as "1", when addressed, a new check can be determined to not be a suspect duplicate if the bit addressed was not equal to the first value, since no check that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash value addresses may be used. In this exemplary embodiment, in order to qualify as a suspected duplicate, the four bits addressed by the hash values should be equal to the altered or first value. In alternative embodiments, other bit size hash functions may be used and divided up into a number of smaller size function. For example, a 128-bit hash function may divided up into four 32-bit functions.

In an exemplary embodiment, the following hash function may be used. It should be appreciated that the following is a mere example and should not be construed to limit the various embodiments of the present invention in any manner. The following is purely illustrative. In this example, L is equal to the string length. The result of the hash function is a hash value which is entered in a hash table. In the following example, showing the Jenkins One-at-a-Time hash algorithm, a 64-bit hash value is used. Other algorithms and bit sizes may be used as are known in the art. For example, a 128-bit MD5 algorithm may be used.

```
for (i=0; i<L; i++) {
hash+=MICR[i];
hash+=(hash<<10);
hash ^=(hash>>6);
}
hash+=(hash<<3);
hash ^=(hash>>11);
hash+=(hash<<15);
return hash.
```

At block 215, the byte and bit address may be computed. The bit address may be of the hash value calculated above. In some embodiments, another bit address may be used. This bit address may be 3-bit address of the bit within a byte. The following is an example calculation of the bit address:

$$bitaddress=hash\ \&\ 0x7.$$

Other bit addresses may be used.

The byte address may vary depending upon the hash table size. For example, a 4 Gigabyte table will have a 32-bit address. The following is an example of calculation of the byte address:

$$byteaddress=(hash>>3)\ \&\ 0xFFFFFFFF.$$

Other byte addresses may be used. In general, for a table of N bytes, byteaddress=(hash>>3) % N, where % is the modulo operator that returns the remainder of division by N.

At block 220, the bit may be read from the hash table. The bit may be read from the hash table to determine if it is unique. For example, if the bit equals to a first value, such as 1, then it may be a suspected duplicate. If the bit equals a second value, such as 0, then it may not be a duplicate. It should be appreciated that other such bit combinations may be used based on the structure of the hash table. An example of an expression which reads a single bit from the hash table is:

$$bit=(table[byteaddress]>>bitaddress)\ \&\ 1.$$

Other bit functions may be used.

At block 225, a check may be made whether the bit is equal to a first value, such as 1. The suspected duplicates may be those with a bit value equal to the first value.

At block 230, the bit may be set to the first value in hash table. This may be performed if the bit does not equal the first value (e.g., it is equal to a second value, such as 0). The bit may be set for a future comparison and to mark the bit as being used. For example, by marking the bit with a first value allows for a comparison with another batch of check data such that another computed bit with the same address will then show up as a suspected duplicate. An example of an expression for setting a bit in the hash table is:

$$table[byteaddress]\mathrel{|}=1<<bitaddress.$$

Other functions may be used.

At block 235, the original bit value may be returned. If the bit was equal to the first value in block 225, then the method may proceed to this step. The original bit value may be returned to identify the suspected duplicate checks for further analysis. If the bit value was equal to the first value, then the check may be considered a suspected duplicate.

Figure 3:
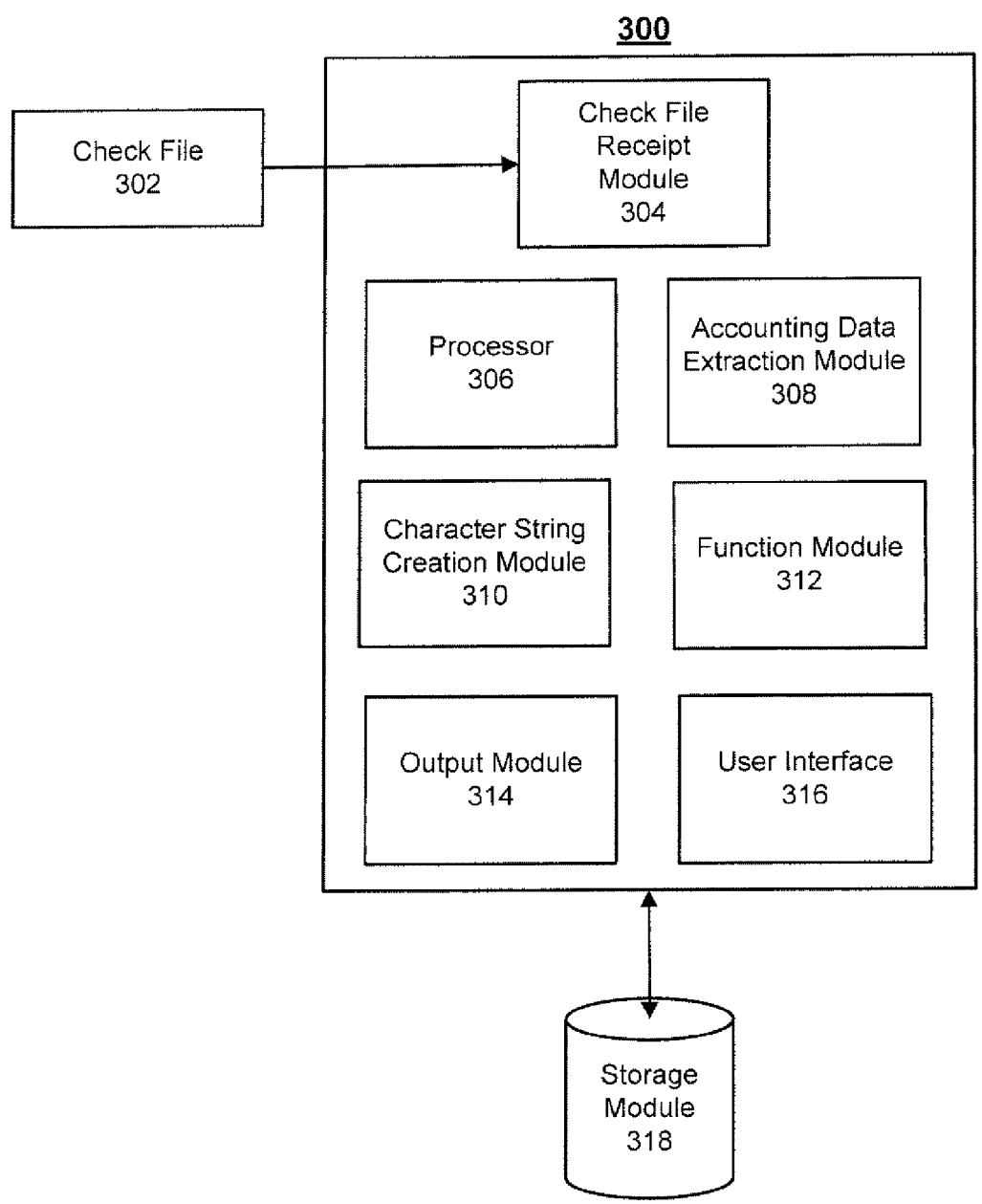
FIG. 3 is a system for duplicate detection in accordance with an exemplary embodiment.

FIG. 3 is a duplicate detection system, according to an exemplary embodiment of the present invention. System 300 may provide various functionality and features associated with duplicate detection. More specifically, system 300 may include a check file receipt module 304, a processor 306, an accounting data extraction module 308, a character string creation module 310, a function module 312, an output module 314, a user interface module 316, and a storage module 318. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 300 may be a computer, such as a general purpose computer which may include a processing machine which has one or more processors. Such a processing machine may execute instruction stored in a memory or memories to process the data.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

A check file 302 may be input into the system 300. The check file may be received by a financial institution. The system 300 may represent a financial institution, such as a bank, credit union, or other such related entity. In addition, the system 300 may be a third party or other intermediary entity in communication with a financial institution. In some embodiments, the system 300 may represent a financial processing system located at a financial institution. Other architectures and schemes may be realized. The check file may include data corresponding to more than one check. The check file may contain images of checks. The images may be in a standard format wherein the standard format is used by the other institutions to facilitate and standardize the exchange of data. For example, an image format, such as X9.37, may be used. The X9.37 image file is a format which uses TIFF based images of the checks along with their associated data. It should be appreciated that other formats may be used for the check file.

The check file may be received by the financial institution by a processing system. Various types of processing systems may be used. The check file may contain various information pertaining to one or more checks. Such information may include check accounting data. Check accounting data may be contained in the form of Magnetic Ink Printing, such as MICR. For example, in the exemplary X9.37 format, this data may be contained in the Type 25 record. The check file may contain various types of checks, such as aux on-us, on-us, and routing and transit. Other types of checks are possible. The check accounting data may include aux on-us, RT, on-us, and amount fields from the check MICR printing. Other types of check accounting data may be possible.

A check file receipt module 304 may receive the check file 302. Check file receipt module 304 may be an input or routing point in the system 300. For example, check receipt module 304 may be a router such that the check file 302 is received and then sent to the proper module, such as the accounting data extraction module 308, or other module for further processing. The image receipt module 304 may store the check file 302. For example, the check file 302 may be stored in check file receipt module 304 while awaiting further processing, the receipt of other check files, and/or other actions or events. Check file receipt module 304 may process the check file 302. For example, check file receipt module 304 may combine two or more check files into one check file for further processing in the system 300. The check file receipt module 304 may review the check file 302 to ensure it is in the proper format for further processing in system 300. The check file receipt module 304 may convert the check file 302 into a proper format as preferred. In some embodiments, the check file receipt module 304 may create an alert that may involve user intervention in the event the check file 302 is not in the proper format for processing, contains an error, or for other reasons. In some embodiments, storage 318 may be used to store the check file 302. It should be appreciated that the check file receipt module 304 may make a back-up copy of the check file 302 prior to any further routing or processing of the check file. For example, such a back-up copy may serve as an archive copy of the check file 302. Other uses are possible. The back-up copy may be stored in storage 318 or other such associated storage.

A processor 306 may be used for processing, calculating, and/or organizing the data. Other functions may be performed by the processor as desired. One or more processors may be provided. The processor 306 is shown as a separate module in FIG. 3, however in some embodiments, the processor 306 may be a distributed processor, such that the processor 306 may be distributed among the various modules shown in FIG. 3. In other embodiments, the processor 300 may be shared with other functionality within other modules (not shown) that may be present in the system 300.

An accounting data extraction module 308 may extract certain elements of the check accounting data. For example, certain elements of the MICR data associated with a check may be extracted. The accounting data may be extracted from the check file 302. The accounting data may be extracted for each check contained in the check file 302. According to an exemplary embodiment, certain elements to extract may be chosen because they may represent unique information to that particular check. For example, fields representing the aux on-us code, the routing and transit number, on-us code, and amount of the check (e.g., field 2, 4, 6, and 7) may be extracted from the MICR data. It should be appreciated that other fields and/or combinations of fields may be used.

A character string creation module 310 may create a string of characters based at least in part on the accounting data extracted by the accounting data extraction module 308. For example, the string of characters may be created from a subset of the elements extracted. In an exemplary embodiment, non-numeric characters, such as letters and symbols, may be eliminated from the string. Other types of filtering may be applied. Therefore, according to an exemplary embodiment, the string created may be numeric in content. The string may then be created by concatenating the extracted fields. The concatenated string may have a length, such as length L. For example, selected record fields may be extracted from the MICR data, as discussed above, any non-numeric characters may be squeezed out, and then remaining numeric characters may combined into a string which may have a length L. It should be appreciated that other strings and/or combination of data fields may be created.

A function module 312 may apply a function to the character string created by the character string creation module 310. A function may be applied to the string to normalize it into a suitable format for indexing, sorting, and/or comparing to other such strings in an efficient manner. The function may be any suitable function to reduce the string to one of a set of ordered values which may be used as an index to a set of Boolean objects. Such a function may be a mathematical function that converts the data, such as the string of characters, into an integer, such as a uniformly distributed pseudo-random integer, which may serve as an index into an array of bits. According to certain applications, a hash table including individually addressed bits may be preferred based upon its small size (relative to computer memory requirements) and ability to provide fast and efficient screening of data. If such a table is initially filled with a initial value, such as "0", and the bits are set to an altered, or first value, such as "1", when addressed, a new check can be determined to not be a suspect duplicate if the bit addressed was not equal to the first value, since no check that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash address values may be used. In this exemplary embodiment, in order to qualify as a suspected duplicate, the four bits addressed by the hash values should be equal to the first value. In alternative embodiments, other bit size hash functions may be used and divided up into a number of smaller size function. For example, a 128-bit hash function may divided up into four 32-bit functions.

It should be appreciated that the function module 312 may use the method described above in FIG. 2. Other such methods may be used to perform the duplicate detection of the embodiments of the present invention.

An output module 314 may output the suspected duplicates identified as a result of the application of the function in the function module 312. The suspected duplicates may be identified based on a comparison of the dataset obtained by applying the function, such as the hash function, described above in the function module 312. For example, if two datasets have matching characters or are considered substantially similar, then the two checks that the data was extracted from may be considered suspected duplicates. Such suspected duplicates may be flagged for further review. The dataset may be compared against a dataset which may include other check data from a pre-determined time period. A pre-determined time period may be selected to allow a comparison with historical data wherein a duplicate of a particular check may be reasonably found. For example, a previous number weeks, such as the previous four weeks, of processed checks may be used. Other such time periods of data may be used. The output module may provide an output in various formats. An alert on a display (not shown) may be output. The alert may be visual in nature. Such a visual alert may be in any suitable format, such as graphics, text or a combination thereof. Audio alerts may be used. An audio alert may include a speaker capability to provide a way to output the sound associated with the audio alert. The output may be a printout, printed to a printer (not shown) attached to the output module 314. A combination of outputs may be used. The suspected duplicate listing may be stored in storage, such as storage 318.

A user interface 316 may allow a user to interact with the system 300. The user interface 316 may allow the user to review the output from the output module 314. The user interface module 316 may provide a suitable interface for the user, such as a graphical user interface (GUI). User input to the system 300 through the user interface module 316 may be completed through such input devices as a keyboard, a touch screen, a trackwheel, or any other input means, as is known in the art.

A storage module 318 may provide storage of data associated with system 300. The storage 318 may include any suitable storage device for the data from the system 300 and its associated modules. While a single storage module is shown for illustrative purposes, storage 318 may include multiple data storage devices at one or multiple locations. The one or more data storage devices may be operatively associated with individual modules in the system 300. Storage 318 may be local, remote, or a combination thereof with respect to the system 300. Storage 318 may utilize a redundant array of disks (RAID), striped disks, hot spare disks, tape, disk, or other computer accessible storage. In one or more embodiments, storage 318 may be a storage area network (SAN), an internet small computer systems interface (iSCSI) SAN, a Fibre Channel SAN, a common Internet File System (CIFS), network attached storage (NAS), or a network file system (NFS). The storage 318 may have back-up capability built-in. Communications with the system 300 may be over a network, such as a local area network or communications may be over a direct connection to the system 300. Data may be transmitted and/or received from the system 300. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

Figure 4:
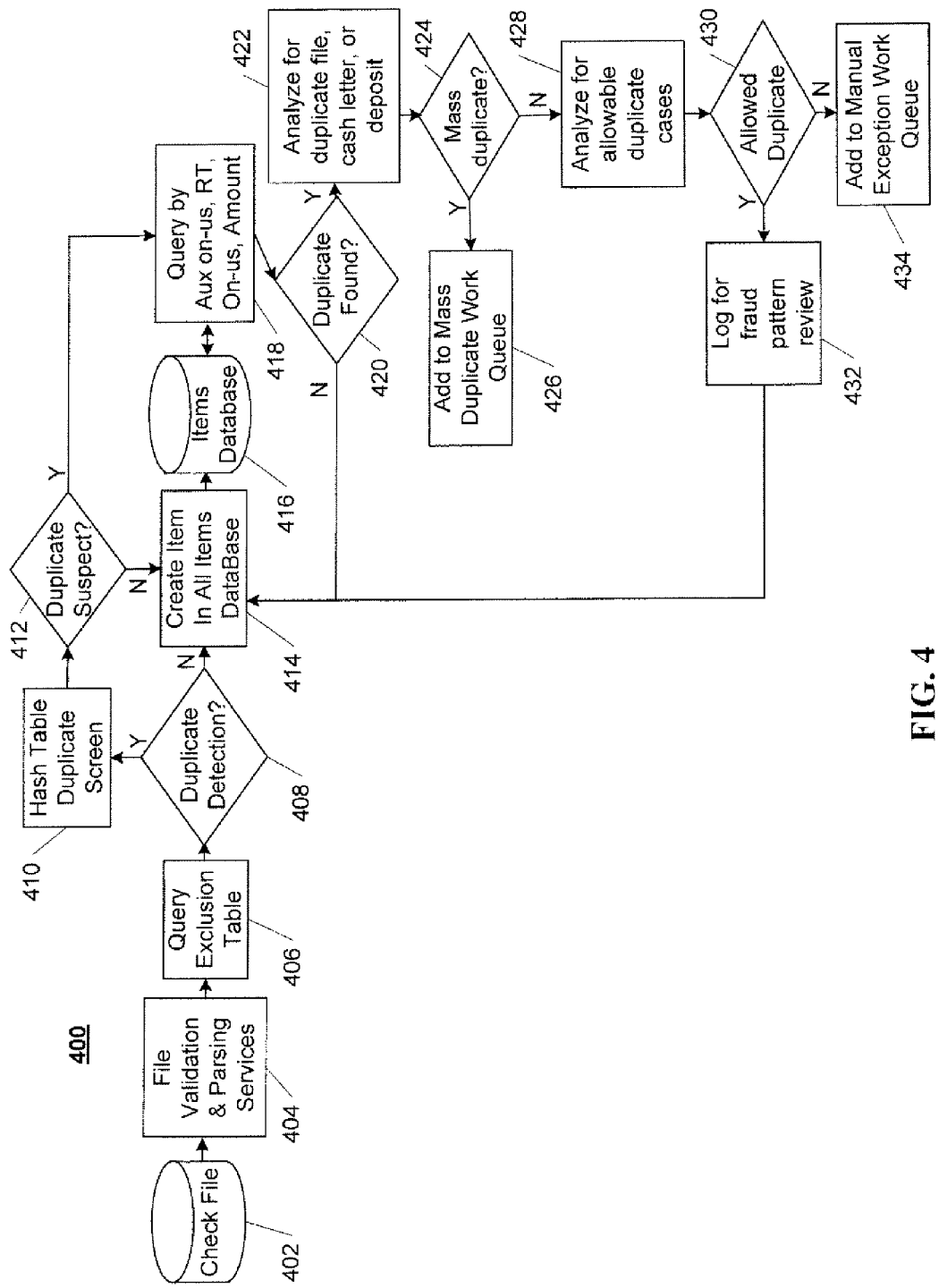
FIG. 4 is an exemplary method for implementation of a duplication detection system in accordance with an exemplary embodiment.

FIG. 4 is an exemplary method for implementation of a duplication detection system in accordance with an embodiment of the present invention. FIG. 4 depicts a flow chart of a method of duplicate check detection of an exemplary embodiment. Exemplary method 400 is provided by way of example, as there are a variety of ways to carry out the methods disclosed herein. The method 400 as shown in FIG. 4 may be executed or otherwise performed by one or a combination of various systems, such as a computer implemented system. Each block shown in FIG. 4 represents one or more processes, methods, and/or subroutines carried out in the exemplary method 400. Each block may have an associated processing machine or the blocks depicted may be carried out through one processor machine. Input may be desired from a user during various parts of the below described method, the input may be accomplished through a user interface.

Referring to FIG. 4, the exemplary method 400 may begin at block 402. A block 402, a check file may be received from a processing system. A block 404, the file may be validated and parsed. At block 406, a routing/transit and/or account exclusion table may be checked. At block 408, a determination may be made whether duplicate detection may be desired. At block 410, if duplicate detection should be performed, a hash table duplication screen may be performed. At block 412, a check may be identified as a duplicate suspect. At block 414, if the check image is not considered a duplicate suspect, then an item may be created in a database. At block 416, a database may be accessed. At block 418, a query may be performed for specific types of checks. At block 420, a determination may be made for a duplicate MICR. At block 422, an analysis may be performed of the duplicate MICR. At block 424, a determination is made of a mass duplicate. At block 426, the mass duplicate may be added to a duplicate work queue. At block 428, an analysis for allowable duplicates may be performed. At block 430, a determination may be made of an allowed duplicate. At block 432, the allowed duplicate may be logged for a fraud pattern review. At block 434, a manual exception work queue entry may be added. These steps will be described in greater detail below.

While the method of FIG. 4 illustrates certain steps performed in a particular order, it should be understood that the embodiments of the present invention may be practiced by adding one or more steps to the processes, omitting steps within the processes and/or altering the order in which one or more steps are performed.

At block 402, a check file may be received from a processing system. The processing system may be a Virtual Processing Center (VPC) Generation 2 processing system or other processing system for financial data, such as check data. It should be appreciated that other such systems may be used. The check file may be in a particular format, such as X9.37, as discussed above. It should be appreciated that other such check formats may be used. The X9.37 and VPC are used are illustrative examples to show the operation of an exemplary embodiment. The check file may contain the images of one or more checks and the check's associated accounting data. The check file may contain the check accounting data for one or more checks. Such check data may be processed by the financial institution. The check data may contain information pertaining to different check types such as on-us, aux on-us, routing/transit (RT), and amount. Other such check types may be possible as are known in the art. According to an exemplary application, the method depicted may be performed on each individual check contained in the check file. In another example, groups of checks may be processed. The method depicted in the following blocks may be performed following receipt of the check file by the financial institution. For example, the duplicate detection processing may occur following check receipt prior to any accounting processing or other such processing by the financial institution. This may be an advantage because duplicates may be detected and separated early in the processing chain.

At block 404, the check file may be validated, parsed, and/or otherwise processed. The check file may be processed to extract the check accounting data for the one or more checks in the check file. The accounting data may be extracted from the MICR data of each check. Specifically, certain fields from the accounting data may be extracted, such as the fields representing the aux on-us code, the routing and transit number, on-us code, and amount of the check (e.g., field 2, 4, 6, and 7 of the X9.37 Type 25 record) may be extracted from the MICR data. These extracted accounting fields may be validated. During validation, if errors are found in the check file, corrections may be performed automatically. In some embodiments, an operator may be alerted to the error and manual intervention may be performed to correct the error. In addition, a combination of automatic and manual error correction may be performed. Other variations may be realized. It should be appreciated that processing may be applied on the extracted accounting data to alter the format into an acceptable format for the processing system. For example, a foreign check may contain fields, such as the RT field, that are formatted in a different manner than those upon a United States check.

At block 406, a query may be performed of an exclusion table. Such a query may be performed to check if the duplicate detection should be performed for each check or group of checks contained in the image file. Some checks or groups of checks may be excluded from duplicate detection for various reasons as would be appreciated in the art. Such exclusions may save processing time and resources by preventing unnecessary processing, for example. Excluded items may include certain RT numbers, account numbers, or combinations thereof. For example, checks which lack serial number information, such as refund or rebate checks, may be excluded because these types of checks may be known to cause a high rate of suspected duplicates.

At block 408, a determination may be performed as to whether duplicate detection should be performed. Such a determination may depend, at least in part, on the results of block 406. Additionally, other such reasons may exist wherein a check may not be subject to the duplication detection method. If duplicate detection should be performed, then the method may proceed to block 410. If no duplicate detection is performed, then the method may proceed to block 414.

At block 410, a hash table duplicate screening may be performed. The hash table duplicate screening may be performed to identify suspected duplicates. Such a hash table duplicate screening is described in FIG. 2 above. It should be appreciated that other such methods for screening are possible, such as using a Bloom filter as described above and in FIG. 5.

At block 412, duplicate suspects may be identified. The duplicate suspects may be those checks whose hash values match that of at least one other check. The collision of the hash values may be indicative of a duplicate check since the hash value is computed from certain MICR fields which make up the accounting data associated with a particular check. It should be appreciated that there may be one or more duplicate suspects identified.

At block 414, an item may be created in an items database. The items database may contain information regarding the checks processed in the system. The information may have item information pertaining to a predetermined period of time. For example, the items database may contain information pertaining to the checks processed during a predetermined period of time by the financial institution. Block 414 may receive inputs from block 408, if no duplicate detection is performed. Block 414 may receive inputs from block 412. The input from block 412 may be the checks determined not to be duplicate suspects which may include the checks that passed the hash table screening since their values did not collide with any other values present in the hash table during the screening. It should be appreciated that checks that may be duplicate suspects may not be added to the items database at this stage. Block 414 may receive inputs from block 420 and 432 as will be described below.

Block 416 represents the items database, which may include any suitable data structure to maintain the information and allow access and retrieval of the information. For example, the database may keep the data in an organized fashion. The items database may be a database, such as an Oracle database, a Microsoft SQL Server database, a DB2 database, a MySQL database, a Sybase database, an object oriented database, a hierarchical database, a flat database, and/or another type of database as may be known in the art.

The items database may be stored in any suitable storage device. The storage may include one of more data storage devices. The one or more data storage devices may be operatively associated with the items database in block 416. The storage may be local, remote, or a combination thereof with respect to the database. The storage 416 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fibre Channel SAN, a common Internet File System (CIFS), network attached storage (NAS), or a network file system (NFS). The database may have back-up capability built-in. Communications with the items database may be over a network, such as a local area network or communications may be over a direct connection to the database. Data may be transmitted and/or received from the items database. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

At block 418, a query by aux on-us, RT, on-us, or amount may be performed. The query may be performed on the one or more duplicate suspects. The query may be performed in the items database of block 416. This query may be automatically or manually performed. A combination of automatic and manual querying may be used. The query may be performed to validate the duplicate suspects identified in block 412, to ensure that the duplicate suspects are not a false positive. The query is performed in the items database to provide a validation of the duplicate suspect when compared against a larger subset of check data.

At block 420, a determination of duplicate data may be performed. The duplicate data may be MICR data. For example, from the query, it may be determined whether the duplicate suspect has MICR data that matches another check in the items database. If no duplicate MICR data is found, then the duplicate suspect may not be a duplicate. If so, then an entry into the items database may be performed at block 414 to provide an entry for potential future duplicate comparison. If duplicate MICR data is found in the items database, then the method continues to block 422.

At block 422, the duplicate MICR data may be analyzed. The analysis may be performed to determine if the check represents a duplicate file, cash letter, deposit, or other instrument. These types of files may be caused by operational or system errors. For example, another bank may send a cash letter with check data that is a duplicate of previously sent check data. This analysis may allow determination of a potential pattern regarding resubmission of check data. A common cause of duplicate checks may then be determined.

At block 424, a check for mass duplicates may be performed. The check for mass duplicates may be performed to identify a pattern of checks using the same data, such as the same serial number. For example, an entity, e.g., companies, financial institutions, etc., may issue checks with the same MICR information, such as the same serial number and amount. This may typically be seen in rebate checks. In other words, mass duplicates may have a cause that is different from the types identified in block 422.

At block 426, if a mass duplicate is found, an entry into the mass duplicate work queue may be made. This entry may alert the system to allow flagging of the mass duplicates in an appropriate manner for further processing. In some embodiments, this entry may add the identified mass duplicates into the exclusion table that may preclude duplicate processing of the identified mass duplicates, such as in block 406.

At block 428, an analysis may be performed for allowable duplicate cases. As discussed above, in some cases, there may be duplicate checks that are allowable. For example, a check may be returned to the depositor or bank of first deposit, and later re-deposited or re-presented.

At block 430, a decision if a duplicate is allowed may be performed. If the duplicate is allowed, then the method proceeds to block 432. If the duplicate is not allowed, then method continues to block 434.

At block 432, if the duplicate is allowed, a log entry for fraud pattern may be made. Such a log entry may be made for future use if the same check appears again. The log may be analyzed for patterns of duplicate checks which indicate possible fraud by statistical analysis, displaying the log for manual fraud review, or other actions. Further, following the log entry, an entry may be made into the items database for future comparison.

At block 434, if the duplicate is not allowed, a manual exception may be added to the work queue. The manual exception may be used to flag the duplicate. Such a flag may ensure that no further processing of the check occurs. The manual exception may be used to alert an operator to remove the accounting data associated with the duplicate from the X9.37 image file so that it is not processed. In some embodiments, this removal of the data may be performed automatically. The operator may review the duplicate suspect and decide whether to allow the check to be posted or cleared to the paying bank, to be returned to the depositor or bank of first deposit, to be removed from the transaction processing stream, or to be referred for fraud investigation. It is understood that the operator may perform other processing at this point. For example, the operator may enter account adjustments to fix the impact of the duplicate check.

Figure 5:
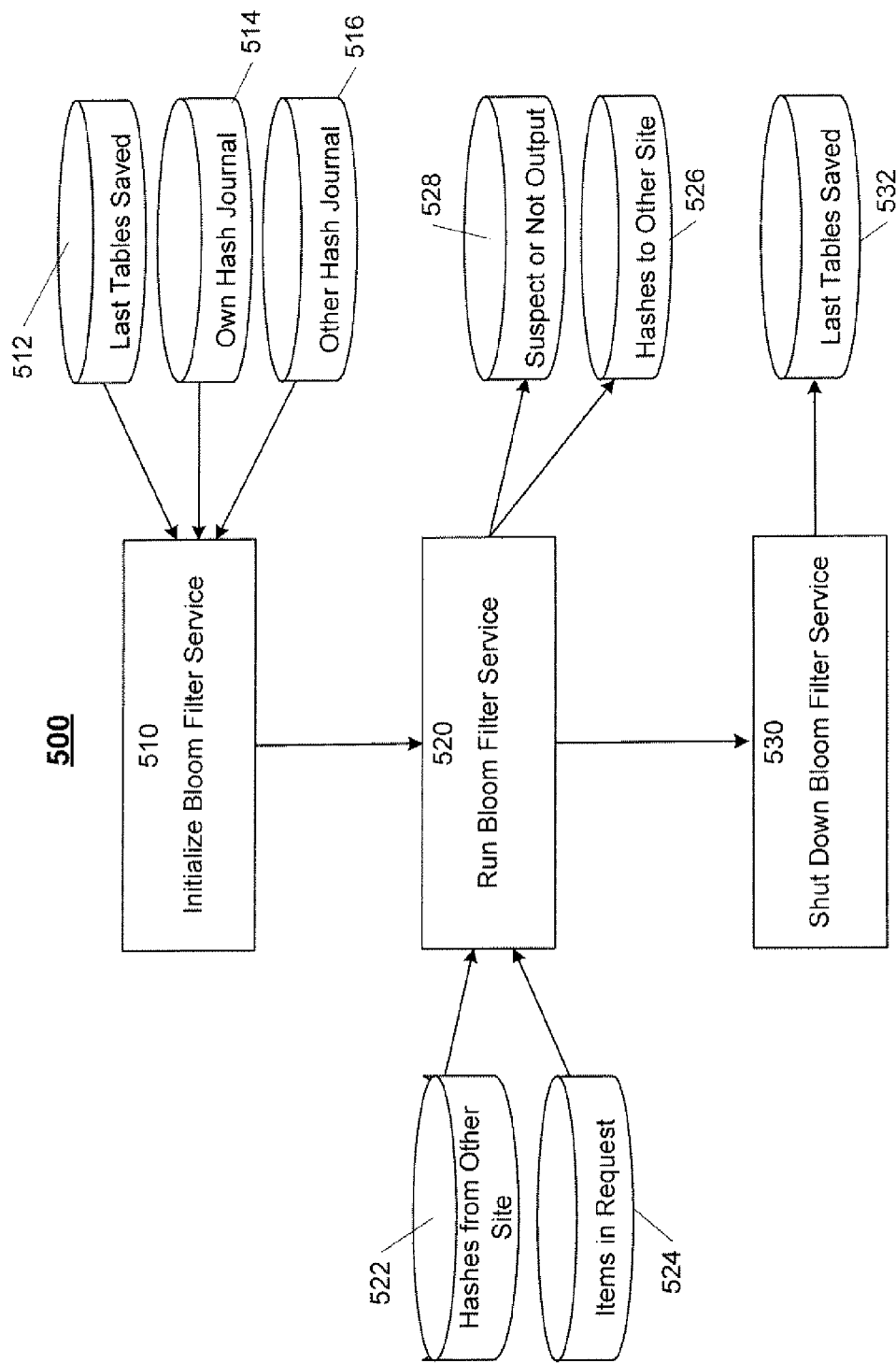
FIG. 5 is an exemplary method of using a Bloom filter for duplication detection in accordance with an exemplary embodiment.

FIG. 5 is an exemplary method for implementation of a duplication detection system in accordance with an embodiment of the present invention. FIG. 5 depicts a flow chart of a method of duplicate detection using a Bloom filter of an exemplary embodiment. Exemplary method 500 is provided by way of example, as there are a variety of ways to carry out the methods disclosed herein. The method of FIG. 5 may be applied to duplicate check detection or duplicate transaction detection as described herein. The method 500 as shown in FIG. 5 may be executed or otherwise performed by one or a combination of various systems, such as a computer implemented system. Each block shown in FIG. 5 represents one or more processes, methods, and/or subroutines carried out in the exemplary method 500. Each block may have an associated processing machine or the blocks depicted may be carried out through one processor machine. Input may be desired from a user during various parts of the below described method, the input may be accomplished through a user interface. Referring to FIG. 5, the exemplary method 500 may begin at block 510. At block 510, a Bloom filter service may be initiated. At block 520, the Bloom filter service may be run. At block 530, the Bloom filter service may be shut down. These steps will be described in greater detail below.

While the method of FIG. 5 illustrates certain steps performed in a particular order, it should be understood that the embodiments of the present invention may be practiced by adding one or more steps to the processes, omitting steps within the processes and/or altering the order in which one or more steps are performed.

It should be appreciated that the Bloom filter service shown and depicted in FIG. 5 may be used in place of or in addition to the hash function shown in FIGS. 2 and 7 (below). The Bloom filter service may be used at block 410 in FIG. 4 in place or in addition to the hash table. While a Bloom filter is illustrated with respect to FIG. 5, other types of filters may be implemented as well.

At block 510, the Bloom filter service may be initiated. The last tables saved 512 may be read. If a recovery start, the Bloom filter's own hash journal 514 and other hash journal 516 may be read. For example, the journals 514 and 516 read may be the most recent journals since the last successful table save in order to update the Bloom filter tables to the point at which the service failed. The other hash journal 516 may be a hash journal data from other sites and/or locations running the duplicate detection method. The loading of the journal data allows the database to be recreated, updated, and synchronized with other databases in operation running the duplicate detection method. The recovery start may be performed following an abnormal shutdown of the Bloom filter service. Such a shutdown may be one where shutdown procedures were not followed or able to be followed so that the tables could be properly saved. An abnormal shutdown may mean that additional processing, such as creation of hash values, may have been performed after the Bloom filter service failed.

At block 520, the Bloom filter service may be executed. The Bloom filter service may read the hashes from other sites 522, and set the corresponding bits in the Bloom filter table so as to synchronize its table with those of the other sites. For example, the Bloom filter service may be executed at multiple sites on separate systems, such as separate VPC systems. The hashes from other sites 522 may allow multiple locations to each maintain a synchronized set of hash tables. The Bloom filter may then read the items in the request 524. The Bloom filter may compute a number of hashes and journal to other site 526, so that the other sites may similarly synchronize their tables. For example, four hashes per item may be computed. In other embodiments, a different number of hashes may be used. The bits in the table at the locations addressed by the hash values may be read. If the bits so read are not each equal to a first value (e.g., 1), the item may not be considered a duplicate suspect. In some embodiments, other combinations of first values may be used. Following reading the hashes, bits may be set at each of the hashes to indicate they have been read. The Bloom filter service may return a flag or other identification of suspect or not a suspect at 528. Such an output may be in the various forms as discussed above for FIGS. 1, 2, 3, and 4.

At block 530, the Bloom filter service may be shut down. The shut down may be performed after each input hash is checked for suspected duplicates or based on other conditions. The tables which have been updated in the foregoing sections may be saved as the last tables saved 532. The tables may be saved for a predetermined period of time. For example, a certain amount of data may be saved in storage for the Bloom filter to run the comparison's against. It should be appreciated that last tables saved 512 and last tables saved 532 may be the same table. For example, the tables saved may be sized to hold a week's checks. Multiple tables corresponding to different days or weeks, for example, may be checked so as to detect duplicates between current items and items processed during those previous periods. At the end of the day, or at the end of the week, the oldest table may be discarded and a new table started for the next day's or week's items. Other such table organizations and sizes are possible.

Figure 6:
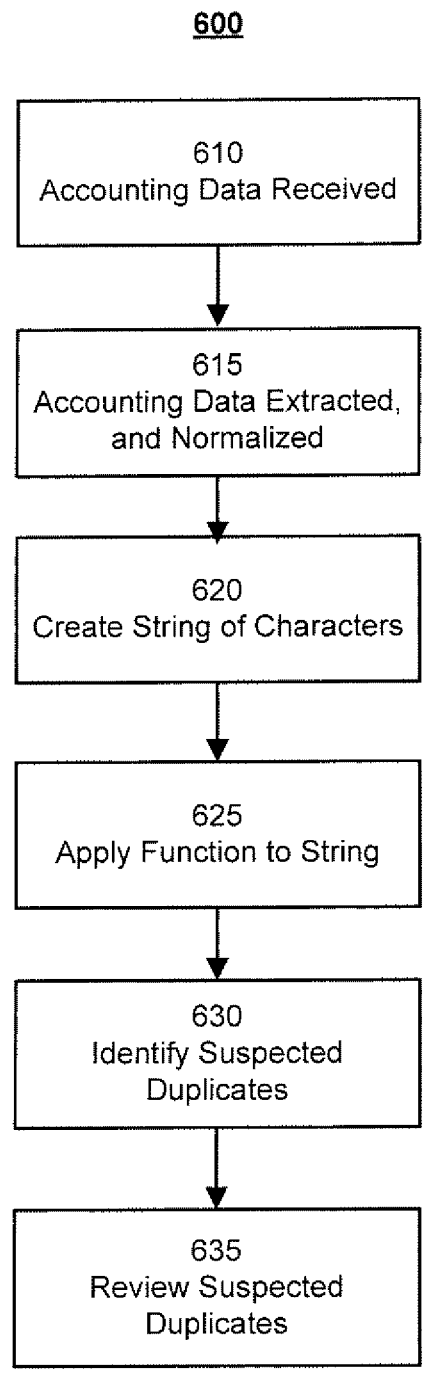
FIG. 6 is a flow chart of a method of duplicate transaction detection in accordance with an exemplary embodiment.

FIG. 6 depicts a flow chart of a method of duplicate transaction detection of an exemplary embodiment. Exemplary method 600 is provided by way of example, as there are a variety of ways to carry out the methods disclosed herein. The method 600 as shown in FIG. 6 may be executed or otherwise performed by one or a combination of various systems, such as a computer implemented system. Each block shown in FIG. 6 represents one or more processes, methods, and/or subroutines carried out in the exemplary method 600. Each block may have an associated processing machine or the blocks depicted may be carried out through one processor machine. Input may be desired from a user during various parts of the below described method, the input may be accomplished through a user interface. Referring to FIG. 6, the exemplary method 600 may begin at block 610. At block 610, an electronic file, containing transaction accounting data, may be received. At block 615, elements of the transaction data may be extracted and normalized. At block 620, a string of characters may be created. At block 625, a function may be applied to the string. At block 630, suspected duplicates may be identified. At block 635, the suspected duplicates may be reviewed. These steps will be described in greater detail below.

It should be appreciated that while the method 600 is described in terms of transaction processing, the method may be applied to other types of data processing to perform duplicate detection.

While the method of FIG. 6 illustrates certain steps performed in a particular order, it should be understood that the embodiments of the present invention may be practiced by adding one or more steps to the processes, omitting steps within the processes and/or altering the order in which one or more steps are performed.

At block 610, a file may be received by a financial institution or other entity. The financial institution may be a bank, credit union, or other such related entity. The file may include transaction data and accounting data. The file may be in an electronic format. The file may be in a standard format wherein the standard format is used by the other institutions to facilitate and standardize the exchange of data.

The file may be received by the financial institution through a processing system. Various processing systems may be used. The file may contain information in the form of data elements pertaining to one or more transactions. Such information may include account number data, transaction amount, card type, account type, currency code(s), accounting data, and/or other data. The accounting data may be contained in electronic data elements in the file. It should be appreciated that in some embodiments, file may be received in a non-electronic form. A conversion to electronic form may be performed to allow extraction of the required information from the file.

At block 615, elements of the transaction data may be extracted and normalized. For example, certain elements of the data may be extracted. According to an exemplary embodiment, elements to extract may be chosen because they may represent unique information to a particular transaction. Non-limiting examples of various data elements are given below for different transaction types. It should be appreciated that all or a subset of the elements may be extracted and used in the method for duplicate detection described below. A subset or portion of each of the listed elements may be used. Furthermore, the elements and transactions listed are exemplary only. For example, for bankcard transactions, the elements extracted may include: Card Number (PAN-Primary Account Number), Transaction Amount, Card Type, Currency Code, and Merchant Name. For example, for ACH payments, the elements extracted may include: Bank Account Number, Bank Account Type (Checking or Savings), Bank Routing Number, Transaction Amount, Payee Name, and Effective Date. For example, for wire transfers, the elements extracted may include: Receiver Bank Routing Number, Type Code, Sender Bank Routing Number, Sender Bank Reference Number, and Transaction Amount.

These elements or fields may be used because they represent elements that typically vary from transaction to transaction. It should be appreciated that other elements and/or combinations of elements may be used. In an exemplary embodiment, non-numeric characters, such as letters and symbols, may be eliminated from the string to normalize it. It should be appreciated that the normalization of data elements may be extended to allow detection of duplicates between different types of transaction types.

At block 620, a string of characters may be created in a form which standardizes the data and removes variations due to differences in the prior capture and data processing systems in order to allow a valid comparison among transactions received from different sources. For example, the string of characters may be created at least in part from the elements extracted in block 615. Because the string of characters may be normalized according to an exemplary embodiment, the string created may be numeric in content. The string may then be created by concatenating the extracted fields. Such a string may have a resulting length, such as length L. For example, selected elements may be extracted from the data, as discussed above, any non-numeric characters may be squeezed out, and then any remaining numeric characters may be combined into a string which may have a length L. It should be appreciated that other strings or combination of data elements may be created.

At block 625, a function may be applied to the string from block 620. The function may be any suitable function to reduce the string to one of a set of elements, e.g., a set of ordered values which may be used as an index to a set of Boolean objects. The function may be a mathematical function that converts the data, such as the string of characters, into an integer, such as a uniformly distributed pseudorandom integer, which may serve as an index into an array, such as an array of bits. According to certain applications, a hash table including individually addressed bits may be preferred based upon its small size (relative to computer memory requirements) and ability to provide fast and efficient screening of data. If such a table is initially filled with a value in an initialized state, or initial value, such as "0", and the bits are set to an altered state, such as a first value, e.g. "1", when addressed, a new transaction can be determined to not be a suspect duplicate if the bit addressed was not equal to the first value, since no transaction that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash tables may be used.

At block 630, suspected duplicates may be identified. For example, the suspected duplicates may be identified based on a comparison of the dataset obtained by applying a function, such as the hash function, in block 625. If two datasets have matching characters or are considered substantially similar, then the two transactions that the data was extracted from may be considered duplicates. Such suspected duplicates may be flagged for further review. The dataset may be compared against a dataset which may include other transaction data from a pre-determined time period. A pre-determined time period may be selected to allow a comparison with historical data wherein a duplicate of a particular transaction may be reasonably found. For example, a previous number weeks, such as the previous four weeks, of processed transactions may be used. Other time periods of data may be used.

In one embodiment, an element may be selected from a set where an index of the element may correspond to the computed value from the function applied in block 625, such as a hash function. The set may be an array. The transaction may be determined to not be a duplicate if the element is in an initialized state, such as "0". The transaction may be determined to be a suspected duplicate if the element is in an altered state, such as "1". Following the determination, if the element was in the initialized state, the state of the element may be modified such that it may be in the altered state.

At block 635, the suspected duplicates may be reviewed. Such a review may be performed as an additional check to confirm that the transactions are indeed duplicates. This review may also identify false-positives. It should be appreciated that suspected duplicates identified by the function in block 620 may be a random collision of values. A random collision of values may occur if the string and another string happen to result in the same hash value, but in reality are not duplicates. In an exemplary embodiment, the review of the suspected duplicates may be manually conducted by an operator. The operator may compare the suspected duplicates against a historical database of transactions processed within a pre-determined period of time. For example, the suspected duplicates may be compared against transactions processed within the last year or other predetermined time periods. In some embodiments, the review may also be automated with minimal or no operator intervention.

Figure 7:
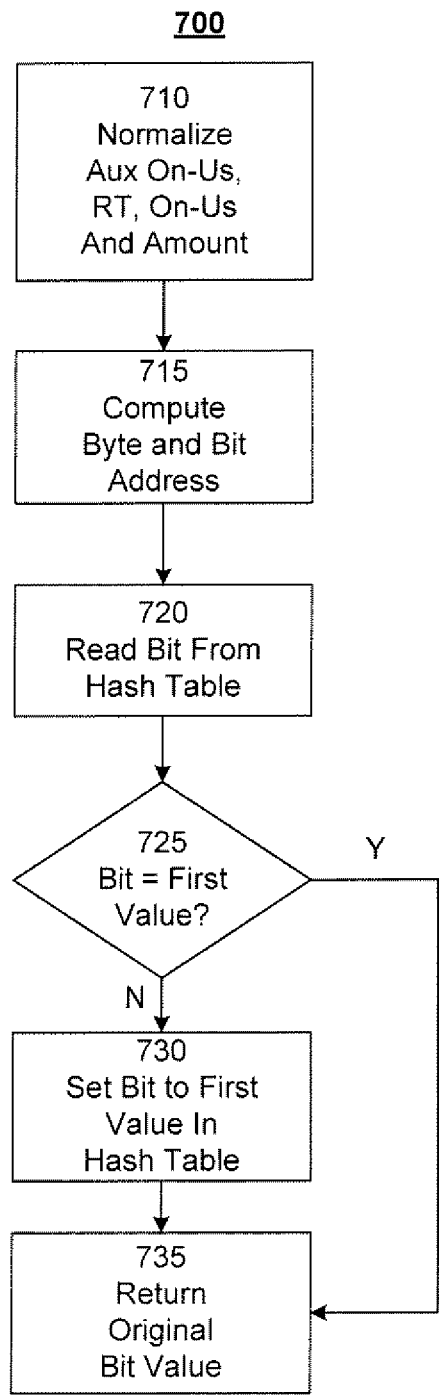
FIG. 7 is a flow chart of a method of duplicate detection using a hash function for duplicate transaction detection in accordance with an exemplary embodiment.

FIG. 7 depicts a flow chart of a method using a hash function for duplicate check detection in an exemplary embodiment. Exemplary method 700 is provided by way of example, as there are a variety of ways to carry out the methods disclosed herein. The method 700 as shown in FIG. 7 may be executed or otherwise performed by one or a combination of various systems, such as a computer implemented system. Each block shown in FIG. 7 represents one or more processes, methods, and/or subroutines carried out in the exemplary method 700. Each block may have an associated processing machine or the blocks depicted may be carried out through one processor machine. Input may be desired from a user during various parts of the below described method, the input may be accomplished through a user interface. Referring to FIG. 7, the exemplary method 700 may begin at block 710. At block 710, transaction data may be normalized. At block 715, a byte and bit address may be computed. At block 720, a bit may be read from the hash table At block 725, a check may be performed to determine if the bit value equals a first value. At block 730, the bit may be set to the first value in the hash table. At block 735, the original bit value is returned. These steps will be described in greater detail below.

While the method of FIG. 7 illustrates certain steps performed in a particular order, it should be understood that the embodiments of the present invention may be practiced by adding one or more steps to the processes, omitting steps within the processes and/or altering the order in which one or more steps are performed.

At block 710, transaction data may be normalized. The normalization of the data may include extraction of certain data elements, creating a string of characters from the extracted data, and normalizing the string through the use of a suitable function. The first step in normalization may involve extracting elements of the transaction data, such as the accounting data. According to an exemplary embodiment, these certain elements to extract may be chosen since they may represent unique information to that particular transaction because they represent fields that typically vary from transaction to transaction. For example, for bankcard transactions, the elements extracted may include: Card Number (PAN-Primary Account Number), Transaction Amount, Card Type, Currency Code, and Merchant Name. For example, for ACH payments, the elements extracted may include: Bank Account Number, Bank Account Type (Checking or Savings), Bank Routing Number, Transaction Amount, Payee Name, and Effective Date. For example, for wire transfers, the elements extracted may include: Receiver Bank Routing Number, Type Code, Sender Bank Routing Number, Sender Bank Reference Number, and Transaction Amount. It should be appreciated that other type of data, transactions, fields and/or combinations of fields may be used.

Next, a string of characters may be created from the extracted data. In an exemplary embodiment, non-numeric characters, such as letters and symbols, may be eliminated from the string. Therefore, according to an exemplary embodiment, the string created may be numeric in content. The string may then be created by concatenating the extracted fields. Such a string may have a resulting length, such as length L. For example, selected record fields may be extracted from the data, as discussed above, any non-numeric characters may be squeezed out, and then remaining numeric characters may be combined into a string which has a length L. It should be appreciated that other strings or combination of data fields may be created.

Then, a function may be applied to the string to normalize it into a suitable format for indexing, sorting, and/or comparing to other such strings in an efficient manner. The function may be any suitable function to reduce the string to one of a set of ordered values which may be used as an index to a set of Boolean objects. Such a function may be a mathematical function that converts the data, such as the string of characters, into an integer, such as a uniformly distributed pseudo-random integer, which may serve as an index into an array, such as an array of bits. According to certain applications, a hash table including individually addressed bits may be preferred based upon its small size (relative to computer memory requirements) and ability to provide fast and efficient screening of data. If such a table is initially filled with an initial value, such as "0", and the bits are set to an altered, or first value, such as "1", when addressed, a new transaction can be determined to not be a suspect duplicate if the bit addressed was not equal to the first value, since no transaction that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash value addresses may be used. In this exemplary embodiment, in order to qualify as a suspected duplicate, the four bits addressed by the hash values should be equal to the altered or first value. In alternative embodiments, other bit size hash functions may be used and divided up into a number of smaller size function. For example, a 128-bit hash function may divided up into four 32-bit functions.

In an exemplary embodiment, the following hash function may be used. It should be appreciated that the following is a mere example and should not be construed to limit the various embodiments of the present invention in any manner. The following is purely illustrative. In this example, L is equal to the string length. The result of the hash function is a hash value which is entered in a hash table. In the following example, showing the Jenkins One-at-a-Time hash algorithm, a 64-bit hash value is used. Other algorithms and bit sizes may be used as are known in the art. For example, a 128-bit MD5 algorithm may be used.

```
for (i=0; i<L; i++) {
  hash+=MICR[i];
  hash+=(hash<<10);
  hash ^(hash>>6);
}
hash+=(hash<<3);
hash ^=(hash>>11);
hash+=(hash<<15);
return hash.
```

At block 715, the byte and bit address may be computed. The bit address may be of the hash value calculated above. In some embodiments, another bit address may be used. This bit address may be 3-bit address of the bit within a byte. The following is an example calculation of the bit address:

$$bitaddress = hash\ \&\ 0x7.$$

Other bit addresses may be used.

The byte address may vary depending upon the hash table size. For example, a 4 Gigabyte table will have a 32-bit address. The following is an example of calculation of the byte address:

$$byteaddress = (hash>>3)\ \&\ 0xFFFFFFFF.$$

Other byte addresses may be used. In general, for a table of N bytes, byteaddress=(hash>>3) % N, where % is the modulo operator that returns the remainder of division by N.

At block 720, the bit may be read from the hash table. The bit may be read from the hash table to determine if it is unique. For example, if the bit equals to a first value, such as 1, then it may be a suspected duplicate. If the bit equals a second value, such as 0, then it may not be a duplicate. It should be appreciated that other such bit combinations may be used based on the structure of the hash table. An example of an expression which reads a single bit from the hash table is:

$$bit = (table[byteaddress]>>bitaddress)\ \&\ 1.$$

Other bit functions may be used.

At block 725, a check may be made whether the bit is equal to a first value, such as 1. The suspected duplicates may be those with a bit value that is the first value.

At block 730, the bit may be set to the first value in hash table. This may be performed if the bit does not equal the first value (e.g., it is equal to the initial value, such as 0). The bit may be set for a future comparison and to mark the bit as being used. For example, by marking the bit with a first value allows for a comparison with another batch of check data such that another computed bit with the same address will then show up as a suspected duplicate. An example of an expression for setting a bit in the hash table is:

$$table[byteaddress] |= 1<<bitaddress.$$

Other functions may be used.

At block 735, the original bit value may be returned. If the bit was equal to the first value in block 725, then the method may proceed to this step. The original bit value may be returned to identify the suspected duplicate transaction for further analysis. If the bit value was equal to the first value, then the transaction may be considered a suspected duplicate.

Figure 8:
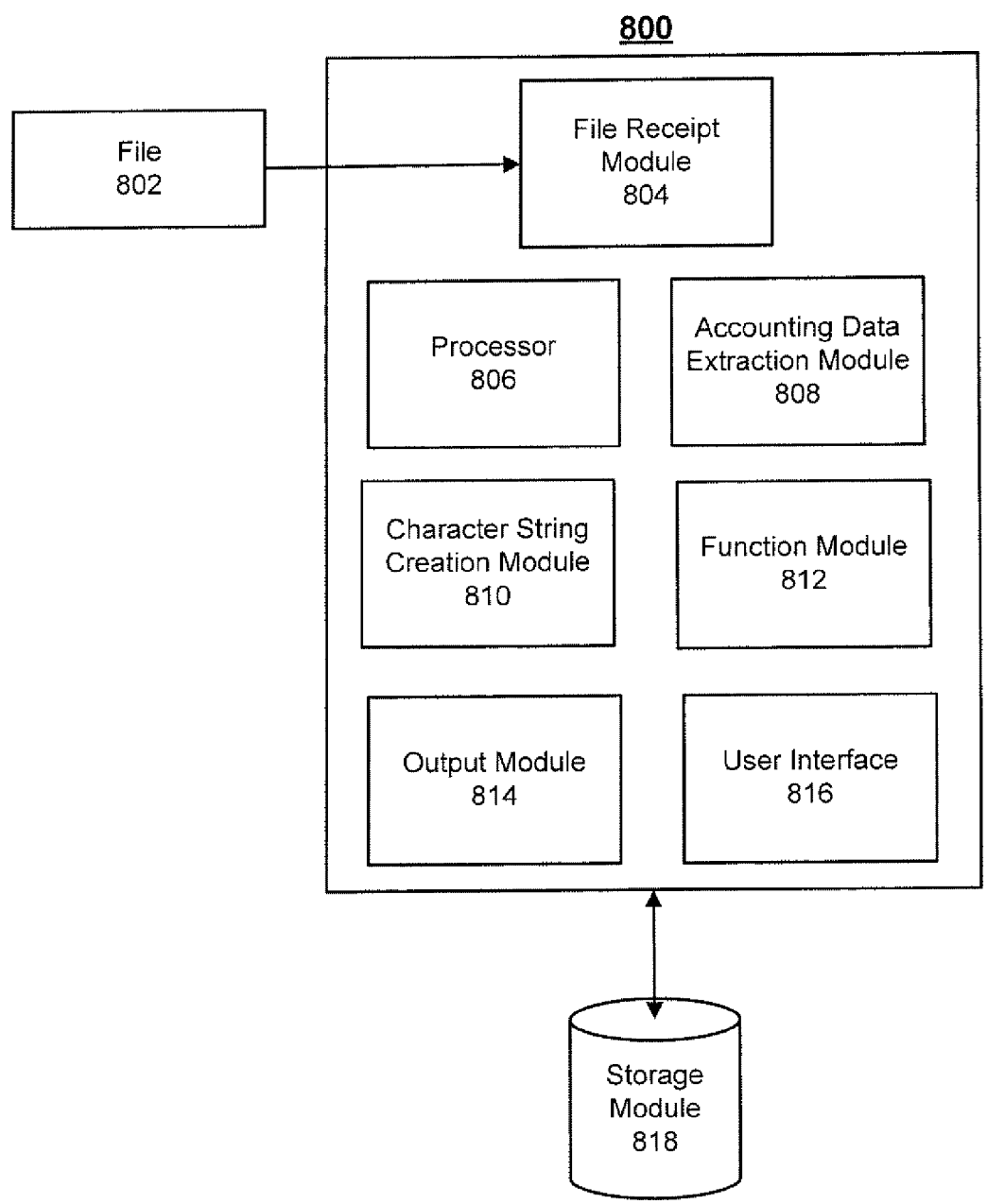
FIG. 8 is a system for duplicate detection in accordance with an exemplary embodiment.

FIG. 8 is a duplicate detection system, according to an exemplary embodiment of the present invention. System 800 may provide various functionality and features associated with duplicate detection. More specifically, system 800 may include a file receipt module 804, a processor 806, an accounting data extraction module 808, a character string creation module 810, a function module 812, an output module 814, a user interface module 816, and a storage module 818. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 800 may be a computer, such as a general purpose computer which may include a processing machine which has one or more processors. Such a processing machine may execute instruction stored in a memory or memory to process the data.

As noted above, the processing machine executes the instructions that are stored in the memory or memories to process data. The memory may be non-transitory. This processing of data may be in response to commands by a user or users of the processing machine, in response to previous processing, in response to a request by another processing machine and/or any other input, for example. As described herein, a module performing functionality may comprise a processor and vice-versa.

A file 802 may be input into the system 800. The file may be received by a financial institution. The system 800 may represent a financial institution, such as a bank, credit union, or other such related entity. In addition, the system 800 may be a third party of other intermediary entity in communication with a financial institution. In some embodiments, the system 800 may represent a financial processing system located at a financial institution. Other architectures and schemes may be realized. The file may include data corresponding to more than one transaction. The file may be electronic and may contain electronic data elements corresponding a plurality of transactions. The file may be a message or sequence of messages received via a network using a communications protocol and containing one or more transactions. Different types of transactions may be included in one file.

The file may be received by the financial institution by a processing system. Various types of processing systems may be used. The file may contain various information pertaining to one or more transactions. Such information may include accounting data, card account numbers, currency codes, account types, merchant names, etc.

A file receipt module 804 may receive the file 802. The file receipt module 804 may be an input or routing point in the system 800. For example, file receipt module 804 may be a router such that the file 802 is received and then sent to the proper module, such as the accounting data extraction module 808, or other module for further processing. The file receipt module 804 may store the file 802. For example, the file 802 may be stored in file receipt module 804 while awaiting further processing, the receipt of other files, and/or other actions or events. The file receipt module 804 may process the file 802. For example, file receipt module 804 may combine two or more files into one file for further processing in the system 800. The file receipt module 804 may review the file 802 to ensure it is in the proper format for further processing in system 800. The file receipt module 804 may convert the file 802 into a proper format as preferred. In some embodiments, the file receipt module 804 may create an alert that may involve user intervention in the event the file 802 is not in the proper format for processing, contains an error, or for other reasons. In some embodiments, storage 818 may be used to store the file 802. It should be appreciated that the file receipt module 804 may make a back-up copy of the file 802 prior to any further routing or processing of the file. For example, such a back-up copy may serve as an archive copy of the check file 802. Other uses are possible. The back-up copy may be stored in storage 818 or other such associated storage.

A processor 806 may be used for processing, calculating, and/or organizing the data. Other functions may be performed by the processor as desired. One or more processors may be provided. The processor 806 is shown as a separate module in FIG. 8, however in some embodiments, the processor 806 may be a distributed processor, such that the processor 806 may be distributed among the various modules shown in FIG. 8. In other embodiments, the processor 800 may be shared with other functionality within other modules (not shown) that may be present in the system 800.

An accounting data extraction module 808 may extract certain elements of the data in the file. For example, certain elements of the accounting data associated with a transaction may be extracted. The accounting data may be extracted from the file 802. The accounting data may be extracted for each transaction contained in the file 802. According to an exemplary embodiment, certain elements to extract may be chosen because they may represent unique information to that particular transaction as described above.

A character string creation module 810 may create a string of characters based at least in part on the accounting data extracted by the accounting data extraction module 808. For example, the string of characters may be created from a subset of the elements extracted. In an exemplary embodiment, non-numeric characters, such as letters and symbols, may be eliminated from the string. Other types of filtering may be applied. Therefore, according to an exemplary embodiment, the string created may be numeric in content. The string may then be created by concatenating the extracted fields. The concatenated string may have a length, such as length L. For example, selected record fields may be extracted from the MICR data, as discussed above, any non-numeric characters may be squeezed out, and then remaining numeric characters may combined into a string which may have a length L. It should be appreciated that other strings and/or combination of data fields may be created.

A function module 812 may apply a function to the character string created by the character string creation module 810. A function may be applied to the string to normalize it into a suitable format for indexing, sorting, and/or comparing to other such strings in an efficient manner. The function may be any suitable function to reduce the string to one of a set of ordered values which may be used as an index to a set of Boolean objects. Such a function may be a mathematical function that converts the data, such as the string of characters, into an integer, such as a uniformly distributed pseudo-random integer, which may serve as an index into an array of bits. According to certain applications, a hash table including individually addressed bits may be preferred based upon its small size (relative to computer memory requirements) and ability to provide fast and efficient screening of data. If such a table is initially filled with a initial value, such as "0", and the bits are set to an altered, or first value, such as "1", when addressed, a new transaction can be determined to not be a suspect duplicate if the bit addressed was not equal to the first value, since no transaction that is hashed to that address has been previously processed. In an exemplary embodiment, a single bit hash table may be used. For example, the single bit may be a first value, such as "1", and the initial value, such as "0". Use of a single bit hash table may mean the table may be of a small, efficient size to allow use in the memory of a server without the need to use disk space or perform look-ups in a database table.

According to an exemplary embodiment, a filter, such as a Bloom filter may be used. A Bloom filter is a data structure that may be used to test for membership of elements in a particular group. A Bloom filter may generate false positives and not false negatives. The accuracy of the Bloom filter may be improved by using multiple functions, such as hash functions. The Bloom filter may provide a smaller table size. As a result, the table of values takes up less computer memory space. The use of a Bloom filter may significantly increase the accuracy of the function for identifying suspected duplicates. For example, a Bloom filter using two or more hash functions may be used. In an exemplary embodiment of the present invention, a Bloom filter using four hash functions resulting in four single bit hash address values may be used. In this exemplary embodiment, in order to qualify as a suspected duplicate, the four bits addressed by the hash values should be equal to the first value. In alternative embodiments, other bit size hash functions may be used and divided up into a number of smaller size function. For example, a 128-bit hash function may be divided up into four 32-bit functions.

It should be appreciated that the function module 812 may use the method described above in FIG. 7. Other such methods may be used to perform the duplicate detection of the embodiments of the present invention.

An output module 814 may output the suspected duplicates identified as a result of the application of the function in the function module 812. The suspected duplicates may be identified based on a comparison of the dataset obtained by applying the function, such as the hash function, described above in the function module 812. For example, if two datasets have matching characters or are considered substantially similar, then the two transaction that the data was extracted from may be considered suspected duplicates. Such suspected duplicates may be flagged for further review. The dataset may be compared against a dataset which may include other transaction data from a pre-determined time period. A pre-determined time period may be selected to allow a comparison with historical data wherein a duplicate of a particular transaction may be reasonably found. For example, a previous number of weeks, such as the previous four weeks, of processed transaction may be used. Other such time periods of data may be used. The output module may provide an output in various formats. An alert on a display (not shown) may be output. The alert may be visual in nature. Such a visual alert may be in any suitable format, such as graphics, text or a combination thereof. Audio alerts may be used. An audio alert may include a speaker capability to provide a way to output the sound associated with the audio alert. The output may be a printout, printed to a printer (not shown) attached to the output module 814. A combination of outputs may be used. The suspected duplicate listing may be stored in storage, such as storage 818.

A user interface 816 may allow a user to interact with the system 800. The user interface 816 may allow the user to review the output from the output module 814. The user interface module 816 may provide a suitable interface for the user, such as a graphical user interface (GUI). User input to the system 800 through the user interface module 816 may be completed through such input devices as a keyboard, a touch screen, a trackwheel, or any other input means, as is known in the art.

A storage module 818 may provide storage of data associated with system 800. The storage 818 may include any suitable storage device for the data from the system 800 and its associated modules. While a single storage module is shown for illustrative purposes, storage 818 may include multiple data storage devices at one or multiple locations. The one or more data storage devices may be operatively associated with individual modules in the system 800. Storage 818 may be local, remote, or a combination thereof with respect to the system 800. Storage 818 may utilize a redundant array of disks (RAID), striped disks, hot spare disks, tape, disk, or other computer accessible storage. In one or more embodiments, storage 818 may be a storage area network (SAN), an internet small computer systems interface (iSCSI) SAN, a Fibre Channel SAN, a common Internet File System (CIFS), network attached storage (NAS), or a network file system (NFS). The storage 818 may have back-up capability built-in. Communications with the system 800 may be over a network, such as a local area network or communications may be over a direct connection to the system 800. Data may be transmitted and/or received from the system 800. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

Figure 9:
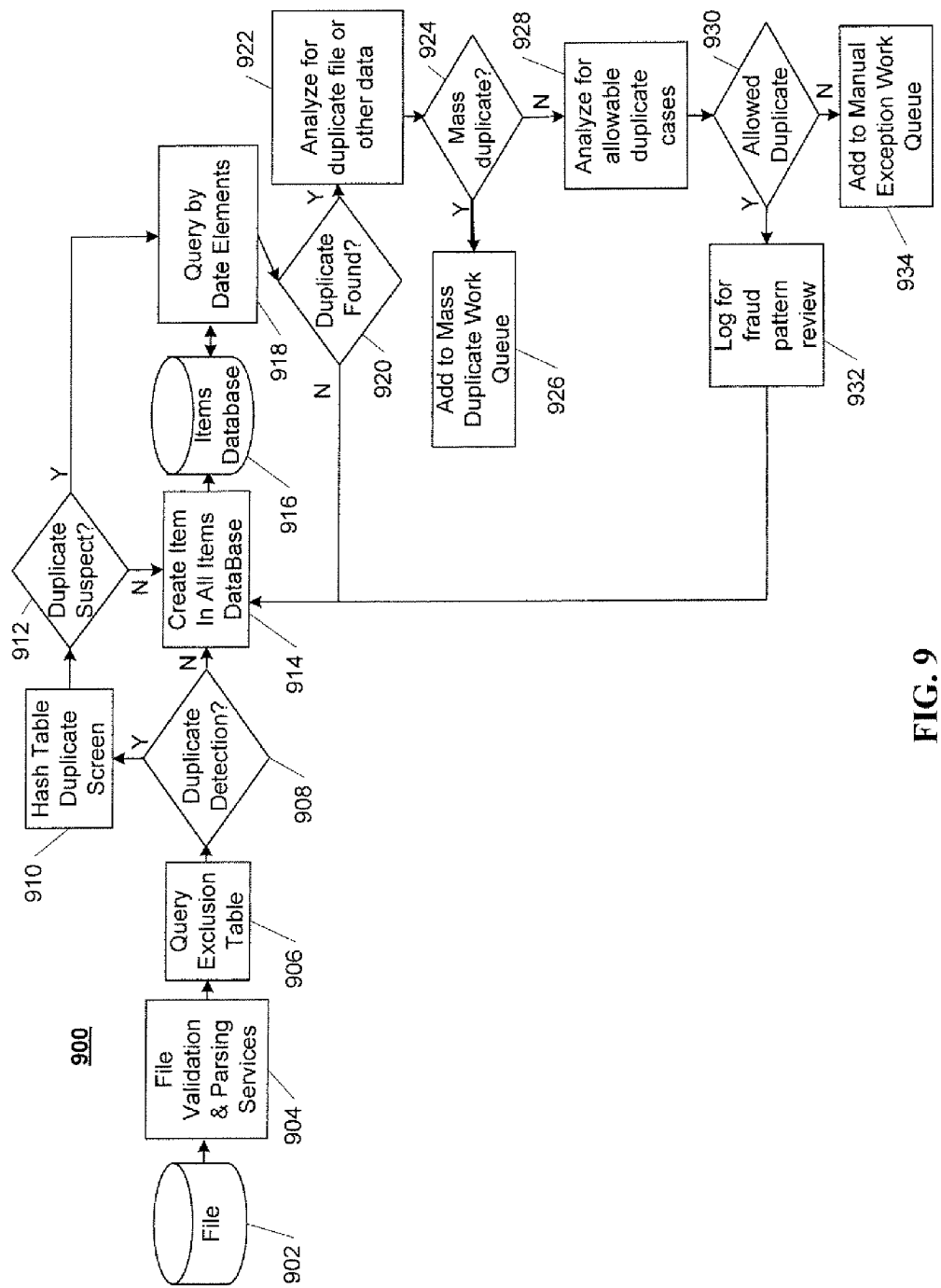
FIG. 9 is an exemplary method for implementation of a duplication detection system in accordance with an exemplary embodiment.

FIG. 9 is an exemplary method for implementation of a duplication detection system in accordance with an embodiment of the present invention. FIG. 9 depicts a flow chart of a method of duplicate detection of an exemplary embodiment. Exemplary method 900 is provided by way of example, as there are a variety of ways to carry out the methods disclosed herein. The method 900 as shown in FIG. 9 may be executed or otherwise performed by one or a combination of various systems, such as a computer implemented system. Each block shown in FIG. 9 represents one or more processes, methods, and/or subroutines carried out in the exemplary method 900. Each block may have an associated processing machine or the blocks depicted may be carried out through one processor machine. Input may be desired from a user during various parts of the below described method, the input may be accomplished through a user interface.

Referring to FIG. 9, the exemplary method 900 may begin at block 902. A block 902, a file may be received from a processing system. A block 904, the file may be validated and parsed. At block 906, an exclusion table containing data values or ranges may be checked. At block 908, a determination may be made based on the data values, ranges and business rules whether duplicate detection may be desired. At block 910, if duplicate detection should be performed, a hash table duplication screen may be performed. At block 912, a transaction may be identified as a duplicate suspect. At block 914, if the transaction is not considered a duplicate suspect, then an item may be created in a database. At block 916, a database may be accessed. At block 918, a query may be performed for specific types of transactions. At block 920, a determination may be made for a duplicate transaction. At block 922, an analysis may be performed of the duplicate transaction. At block 924, a determination is made of a duplicate. At block 926, the duplicate may be added to a duplicate work queue. At block 928, an analysis for allowable duplicates may be performed. At block 930, a determination may be made of an allowed duplicate. At block 932, the allowed duplicate may be logged for a fraud pattern review. At block 934, a manual exception work queue entry may be added. These steps will be described in greater detail below.

While the method of FIG. 9 illustrates certain steps performed in a particular order, it should be understood that the embodiments of the present invention may be practiced by adding one or more steps to the processes, omitting steps within the processes and/or altering the order in which one or more steps are performed.

At block 902, a file may be received from a processing system. The processing system may be a processing system for financial data, such as transaction data. It should be appreciated that other such systems may be used. The file may be in a particular format. The file may contain the data corresponding to one or more transactions including the transactions associated accounting data. The file may contain the accounting data for one or more transactions. Such data may be processed by the financial institution. The data may contain information pertaining to different transaction types such as bankcard transactions, ACH payment data, and wire transfers. The file may contain all one type of transaction or a plurality of types of transactions. Each transaction may have a set of data elements associated with it. Other such transaction types may be possible as are known in the art. According to an exemplary application, the method depicted may be performed on each individual transaction contained in the file. In another example, groups of transactions may be processed. The method depicted in the following blocks may be performed following receipt of the file by the financial institution. For example, the duplicate detection processing may occur following file receipt prior to any accounting processing or other such processing by the financial institution. This may be an advantage because duplicates may be detected and separated early in the processing chain.

At block 904, the file may be validated, parsed, and/or otherwise processed. The file may be processed to extract the transaction data for the one or more transactions in the file. The accounting data may be extracted from the data elements of each transaction. Specifically, certain fields from the accounting data may be extracted as described above.

These extracted accounting fields may be validated. During validation, if errors are found in the file, corrections may be performed automatically. In some embodiments, an operator may be alerted to the error and manual intervention may be performed to correct the error. In addition, a combination of automatic and manual error correction may be performed. Other variations may be realized. It should be appreciated that processing may be applied on the extracted accounting data to alter the format into an acceptable format for the processing system. For example, foreign transaction data may contain fields that are formatted in a different manner than those for a United States transaction.

At block 906, a query may be performed of an exclusion table. Such a query may be performed to check if the duplicate detection should be performed for each transaction or group of transactions contained in the file. Some transactions or groups of transactions may be excluded from duplicate detection for various reasons as would be appreciated in the art. Such exclusions may save processing time and resources by preventing unnecessary processing, for example. Excluded items may include certain account numbers, card numbers, merchants, or combinations thereof.

At block 908, a determination may be performed as to whether duplicate detection should be performed. Such a determination may depend, at least in part, on the results of block 906. Additionally, other such reasons may exist wherein a transaction may not be subject to the duplication detection method. If duplicate detection should be performed, then the method may proceed to block 910. If no duplicate detection is performed, then the method may proceed to block 914.

At block 910, a hash table duplicate screening may be performed. The hash table duplicate screening may be performed to identify suspected duplicates. Such a hash table duplicate screening is described in FIG. 7 above. It should be appreciated that other such methods for screening are possible, such as using a Bloom filter as described above and in FIG. 5.

At block 912, duplicate suspects may be identified. The duplicate suspects may be those transactions whose hash values match that of at least one other transaction. The collision of the hash values may be indicative of a duplicate transaction since the hash value is computed from certain data fields which make up the accounting data associated with a particular transaction. It should be appreciated that there may be one or more duplicate suspects identified.

At block 914, an item may be created in an items database. The items database may contain information regarding the transactions processed in the system. The information may have item information pertaining to a predetermined period of time. For example, the items database may contain information pertaining to the transactions processed during a predetermined period of time by the financial institution. Block 914 may receive inputs from block 908, if no duplicate detection is performed. Block 914 may receive inputs from block 912. The input from block 912 may be the transactions determined not to be duplicate suspects which may include the transactions that passed the hash table screening since their values did not collide with any other values present in the hash table during the screening. It should be appreciated that transactions that may be duplicate suspects may not be added to the items database at this stage. Block 914 may receive inputs from block 920 and 932 as will be described below.

Block 916 represents the items database, which may include any suitable data structure to maintain the information and allow access and retrieval of the information. For example, the database may keep the data in an organized fashion. The items database may be a database, such as an Oracle database, a Microsoft SQL Server database, a DB2 database, a MySQL database, a Sybase database, an object oriented database, a hierarchical database, a flat database, and/or another type of database as may be known in the art.

The items database may be stored in any suitable storage device. The storage may include one of more data storage devices. The one or more data storage devices may be operatively associated with the items database in block 916. The storage may be local, remote, or a combination thereof with respect to the database. The storage 916 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fibre Channel SAN, a common Internet File System (CIFS), network attached storage (NAS), or a network file system (NFS). The database may have back-up capability built-in. Communications with the items database may be over a network, such as a local area network or communications may be over a direct connection to the database. Data may be transmitted and/or received from the items database. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

At block 918, a query by data elements may be performed. The query may be performed using one or more data elements associated with a transaction. The query may be performed on the one or more duplicate suspects. The query may be performed in the items database of block 916. This query may be automatically or manually performed. A combination of automatic and manual querying may be used. The query may be performed to validate the duplicate suspects identified in block 912, to ensure that the duplicate suspects are not a false positive. The query is performed in the items database to provide a validation of the duplicate suspect when compared against a larger subset of transaction data.

At block 920, a determination of duplicate data may be performed. The duplicate data may be accounting data. For example, from the query, it may be determined whether the duplicate suspect has accounting data that matches another transaction in the items database. If no duplicate accounting data is found, then the duplicate suspect may not be a duplicate. If so, then an entry into the items database may be performed at block 914 to provide an entry for potential future duplicate comparison. If duplicate accounting data is found in the items database, then the method continues to block 922.

At block 922, the duplicate accounting data may be analyzed. The analysis may be performed to determine if the transaction represents a duplicate file or other transaction. These types of files may be caused by operational or system errors. For example, another bank may send a file with transaction data that is a duplicate of previously sent transaction data. This analysis may allow determination of a potential pattern regarding resubmission of transaction data. A common cause of duplicate transactions may then be determined.

At block 924, a check for mass duplicates may be performed. The check for mass duplicates may be performed to identify a pattern of transactions using the same accounting data, such as the same card number. In other words, mass duplicates may have a cause that is different from the types identified in block 922.

At block 926, if a mass duplicate is found, an entry into the mass duplicate work queue may be made. This entry may alert the system to allow flagging of the mass duplicates in an appropriate manner for further processing. In some embodiments, this entry may add the identified mass duplicates into the exclusion table that may preclude duplicate processing of the identified mass duplicates, such as in block 906.

At block 928, an analysis may be performed for allowable duplicate cases or what appear to be duplicate cases. As discussed above, in some cases, there may be duplicate transaction that are allowable. For example, a transaction may be deliberately charged twice for a single customer. Such as, for example, two debit card transactions at the same store for the same item charged by the same customer within a short period of time. Duplicate transactions may occur at automated teller machines or financial transaction devices. In other embodiments, the duplicate transaction may be a mistake or inadvertent such as a merchant inadvertently charging an item twice or a customer submitting a purchase request twice or more during an e-commerce transaction at a website.

At block 930, a decision if a duplicate is allowed may be performed. If the duplicate is allowed, then the method proceeds to block 932. If the duplicate is not allowed, then method continues to block 934.

At block 932, if the duplicate is allowed, a log entry for fraud pattern may be made. Such a log entry may be made for future use if the same transaction appears again. The log may be analyzed for patterns of duplicate transactions which indicate possible fraud by statistical analysis, displaying the log for manual fraud review, or other actions. Further, following the log entry, an entry may be made into the items database for future comparison.

At block 934, if the duplicate is not allowed, a manual exception may be added to the work queue. The manual exception may be used to flag the duplicate. Such a flag may ensure that no further processing of the transaction occurs. The manual exception may be used to alert an operator to remove the accounting data associated with the duplicate from the file so that it is not processed. In some embodiments, this removal of the data may be performed automatically. The operator may review the duplicate suspect and decide whether to allow the transaction to be posted or cleared to the paying bank, to be returned to the depositor or bank of first deposit, to be removed from the transaction processing stream, or to be referred for fraud investigation. It is understood that the operator may perform other processing at this point. For example, the operator may enter account adjustments to fix the impact of the duplicate transaction.

Hereinafter, aspects of implementation of the inventions will be described. As described above, the method of the invention may be computer implemented as a system. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. For example, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, Python, REXX, Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of media or medium, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of duplicate detection, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, uses and advantages of the present invention will be apparent to those skilled in the art from consideration of the specification and practice of the invention disclosed herein. The specification and examples should be considered exemplary. The intended scope of the invention is limited by the claims appended hereto.

What is claimed is:

1. A system for detecting duplicate transactions, comprising:
   at least one processor;
   a memory comprising computer-readable instructions which when executed by the processor cause the processor to perform the steps comprising:
   receiving electronic data that comprises accounting data associated with one or more transactions;
   processing the electronic data to extract the accounting data;
   creating a character string from a subset of the accounting data for each of the one or more transactions;
   applying a Bloom filter using multiple hash functions to the character string;
   determining that a transaction is a potential suspected duplicate if each bit value read is equal to a first value;
   determining that the transaction is not a suspected duplicate if at least one bit value is not equal to the first value;
   outputting a listing of each potential suspected duplicate; and
   performing additional processing on each potential suspected duplicate to determine if the potential suspected duplicate is a true suspected duplicate.

2. The system of claim 1, further comprising:
   comparing the electronic data to an exclusion table; and
   removing the electronic data from further processing upon transaction data appearing on the exclusion table.

3. The system of claim 1, further comprising:
   allowing a user to interact with the system through an interface.

4. The system of claim 3, wherein the interface allows a user to review the listing of suspected duplicates.

5. The system of claim 1, wherein the electronic data is in a format from which the accounting data can be extracted.

6. The system of claim 1, wherein the accounting data comprises electronic data elements.

7. The system of claim 4, wherein the user queues one or more of the true suspected duplicates for fraud analysis.

8. The system of claim 1, wherein the determination of suspected duplicates is performed against transaction data for a predetermined time period.

9. The system of claim 1, wherein the Bloom filter is part of a Bloom filter service.

10. The system of claim 9, further comprising:
    starting the Bloom filter service upon receipt of the electronic data.

11. The system of claim 10, further comprising:
    stopping the Bloom filter service upon completion of determining if each transaction is a suspected duplicate.

12. The system of claim 1, wherein the one or more transactions comprise bankcard transactions.

13. The system of claim 12, wherein the bankcard transactions comprise credit or debit transactions.

14. The system of claim 12, wherein the electronic data comprises: card number, transaction amount, card type, currency code, and merchant name.

15. The system of claim 1, wherein the one or more transactions comprise ACH payments.

16. The system of claim 15, wherein the electronic data comprises: bank account number, bank account type, bank routing number, transaction amount, payee name, and effective date.

17. The system of claim 1, wherein the one or more transactions comprise wire transfers.

18. The system of claim 17, wherein the electronic data comprises: receiver bank routing number, type code, sender bank routing number, sender bank reference number, and transaction amount.

19. A method for detecting duplicate transactions, comprising:
    receiving electronic data that comprises accounting data associated with one or more transactions;
    processing, by at least one computer processor, the electronic data to extract the accounting data;
    creating, by the at least one computer processor, a character string from a subset of the accounting data for each of the one or more transactions;
    applying a Bloom filter using multiple hash functions to the character string;
    determining that a transaction is a potential suspected duplicate if each bit value read is equal to a first value;
    determining that the transaction is not a suspected duplicate if at least one bit value is not equal to the first value;
    outputting a listing of each potential suspected duplicate; and
    performing additional processing on each potential suspected duplicate to determine if the potential suspected duplicate is a true suspected duplicate.

20. The method of claim 19, further comprising:
    comparing the electronic data to an exclusion table; and
    removing the electronic data from further processing upon transaction data appearing on the exclusion table.

21. The method of claim 19, further comprising:
    allowing a user to interact with the system through an interface.

22. The method of claim 21, wherein the interface allows a user to review the listing of suspected duplicates.

23. The method of claim 19, wherein the electronic data is in a format from which the accounting data can be extracted.

24. The method of claim 19, wherein the accounting data comprises electronic data elements.

25. The method of claim 22, wherein the user queues one or more of the true suspected duplicates for fraud analysis.

26. The method of claim 19, wherein the determination of suspected duplicates is performed against transaction data for a predetermined time period.

27. The method of claim 19, wherein the Bloom filter is part of a Bloom filter service.

28. The method of claim 27, further comprising:
    starting the Bloom filter service upon receipt of the electronic data.

29. The method of claim 28, further comprising:
stopping the Bloom filter service upon completion of determining if each transaction is a suspected duplicate.

30. The method of claim 19, wherein the one or more transactions comprise bankcard transactions.

31. The method of claim 30, wherein the bankcard transactions comprise credit or debit transactions.

32. The method of claim 30, wherein the electronic data comprises: card number, transaction amount, card type, currency code, and merchant name.

33. The method of claim 19, wherein the one or more transactions comprise ACH payments.

34. The method of claim 33, wherein the electronic data comprises: bank account number, bank account type, bank routing number, transaction amount, payee name, and effective date.

35. The method of claim 19, wherein the one or more transactions comprise wire transfers.

36. The method of claim 35, wherein the electronic data comprises: receiver bank routing number, type code, sender bank routing number, sender bank reference number, and transaction amount.

37. The system of claim 1, wherein the multiple hash functions comprise four hash functions.

38. The method of claim 19, wherein the multiple hash functions comprise four hash functions.

\* \* \* \* \*